US010062112B1

(12) United States Patent
Tatang et al.

(10) Patent No.: US 10,062,112 B1
(45) Date of Patent: Aug. 28, 2018

(54) SYSTEMS, METHODS, AND COMPUTER-READABLE STORAGE MEDIA FOR CALCULATING A HOUSING VOLATILITY INDEX

(75) Inventors: Menner Tatang, Great Falls, VA (US); J. Douglas Gordon, Arlington, VA (US); Ming Xiong, Ashburn, VA (US); Shaojie Chen, McLean, VA (US)

(73) Assignee: Federal Home Loan Mortgage Corporation (Freddie Mac), McLean, VA (US)

(*) Notice: Subject to any disclaimer, the term of this patent is extended or adjusted under 35 U.S.C. 154(b) by 477 days.

(21) Appl. No.: 13/620,112

(22) Filed: Sep. 14, 2012

Related U.S. Application Data

(62) Division of application No. 12/621,065, filed on Nov. 18, 2009.

(51) Int. Cl.
*G06Q 40/00* (2012.01)
*G06Q 40/04* (2012.01)
*G06Q 40/06* (2012.01)
*G06Q 40/02* (2012.01)

(52) U.S. Cl.
CPC .......... *G06Q 40/04* (2013.01); *G06Q 40/025* (2013.01); *G06Q 40/06* (2013.01)

(58) Field of Classification Search
CPC ....... G06Q 40/04; G06Q 40/06; G06Q 40/025
See application file for complete search history.

(56) References Cited

U.S. PATENT DOCUMENTS

| 7,831,492 | B1 | 11/2010 | An et al. | |
| 2004/0267657 | A1* | 12/2004 | Hecht | G06Q 40/00 705/37 |
| 2005/0216384 | A1* | 9/2005 | Partlow | G06Q 40/06 705/35 |
| 2006/0184450 | A1* | 8/2006 | Ely | G06Q 40/025 705/38 |
| 2007/0244780 | A1* | 10/2007 | Liu | 705/35 |
| 2008/0168001 | A1 | 7/2008 | Kagarlis | |
| 2009/0099948 | A1* | 4/2009 | Geltner et al. | 705/35 |
| 2009/0271333 | A1* | 10/2009 | Payrovi | G06Q 40/06 705/36 R |
| 2010/0057538 | A1 | 3/2010 | Hardman et al. | |
| 2011/0218826 | A1* | 9/2011 | Birtel et al. | 705/4 |
| 2011/0313945 | A1* | 12/2011 | Callan | 705/36 R |

* cited by examiner

*Primary Examiner* — Kirsten S Apple
*Assistant Examiner* — Mike Anderson
(74) *Attorney, Agent, or Firm* — Finnegan, Henderson, Farabow, Garrett & Dunner, LLP

(57) ABSTRACT

Systems, methods, and computer-readable media are disclosed for calculating a housing volatility index. An exemplary embodiment includes accessing stored property value data reflecting first values of real estate properties during a first time period and second values of the real estate properties during a second time period. The second time period may be subsequent to the first time period. The property value data may be processed to identify the first values and the second values, and time intervals between dates of the first values and dates of the second values may be calculated. Value changes of the real estate properties over the time intervals may also be calculated, based on the first values and the second values. A volatility measure for the real estate properties may be determined based on the value changes of the real estate properties over the time intervals, and the volatility measure may be output to a user.

7 Claims, 15 Drawing Sheets

| address | state | county | months diff. | log(price 1/ price 2) | Variance | Avg. Months Diff. | Annualized Variance | Number of Data Points |
|---|---|---|---|---|---|---|---|---|
| 123 Pear St. | VA | 1 | 88 | 0.09531018 | 0.0107749 | 82 | 0.00157681 | 4 |
| 456 Apple St. | VA | 1 | 86 | 0.182321557 | | | | |
| 789 Plum St. | VA | 1 | 82 | 0.262364264 | | | | |
| 159 Grape St. | VA | 1 | 72 | 0.336472237 | | | | |

| | |
|---|---|
| Annualized Variance: | 0.00157681 |
| Annualized Standard Deviation | 0.03970907 |

| | |
|---|---|
| January 2000 Standard Deviation | 0.02911 |
| May 2009 Home Volatility Index - county 1 of VA | 136.410411 |

400

| address | state | county | price 1 | date 1 | price 2 | date 2 |
|---|---|---|---|---|---|---|
| 123 Pear St. | VA | 1 | 100,000 | Jan-02 | 110,000 | May-09 |
| 456 Apple St. | VA | 1 | 100,000 | Feb-02 | 120,000 | Apr-09 |
| 789 Plum St. | VA | 1 | 100,000 | May-02 | 130,000 | Mar-09 |
| 159 Grape St. | VA | 1 | 100,000 | Dec-02 | 140,000 | Dec-08 |

| address | state | county | months diff. | log(price 1/ price 2) | Variance | Avg. Months Diff. | Annualized Variance | Number of Data Points |
|---|---|---|---|---|---|---|---|---|
| 123 Pear St. | VA | 1 | 88 | 0.09531018 | 0.0107749 | 82 | 0.00157681 | 4 |
| 456 Apple St. | VA | 1 | 86 | 0.182321557 | | | | |
| 789 Plum St. | VA | 1 | 82 | 0.262364264 | | | | |
| 159 Grape St. | VA | 1 | 72 | 0.364472237 | | | | |
| Annualized Variance: | | | 0.00157681 | | | | | |
| Annualized Standard Deviation | | | 0.03970907 | | | | | |
| January 2000 Standard Deviation | | | 0.02911 | | | | | |
| May 2009 Home Volatility Index - county 1 of VA | | | 136.410411 | | | | | |

| county | state | time difference in years | variance | average time difference in months | annualized variance | Number of transactions | National Weighted Variance | National Weighted Standard Deviation | National Index |
|---|---|---|---|---|---|---|---|---|---|
| 1 | VA | 1 | 0.0011 | 10 | 0.00132 | 5 | 0.0015415 | 0.039261449 | 134.8727 |
| 1 | VA | 2 | 0.0025 | 23 | 0.00130435 | 6 | | | |
| ... | | ... | | | | | | | |
| 1 | | 10 | 0.0101 | 117 | 0.0010359 | 12 | | | |
| 2 | VA | 1 | 0.0013 | 9 | 0.00173333 | 9 | | | |
| 2 | VA | 2 | 0.0029 | 22 | 0.00158182 | 3 | | | |
| 2 | VA | 10 | 0.0131 | 119 | 0.00132101 | 7 | | | |
| 1 | MD | 1 | 0.0009 | 11 | 0.00098182 | 8 | | | |
| 1 | MD | 2 | 0.0035 | 23 | 0.00182609 | 5 | | | |
| 1 | MD | 10 | 0.0139 | 116 | 0.00143793 | 9 | | | |
| 2 | MD | 1 | 0.0015 | 8 | 0.00225 | 8 | | | |
| 2 | MD | 2 | 0.0027 | 19 | 0.00170526 | 8 | | | |
| 2 | MD | 10 | 0.0195 | 118 | 0.00198305 | 12 | | | |

AVM Performance Data

| | June-09 | July-09 | August-09 |
|---|---|---|---|
| Volatility | 110 | 120 | 100 |
| AVM 1 | 76% | 74% | 83% |
| AVM 2 | 70% | 62% | 75% |
| AVM 3 | 78% | 76% | 77% |

Volatility-adjusted model thresholds

| | 80 | 90 | 100 | 110 | 120 |
|---|---|---|---|---|---|
| Threshold | 99.90% | 88.80% | 79.92% | 72.65% | 66.60% |

| Volatility-adjusted Pricing Dispersion | | | | |
|---|---|---|---|---|
| Current Volatility | 1 year | 2 year | 3 year | 4 year |
| 80 | 8.0000% | 9.6000% | 12.0000% | 16.0000% |
| 90 | 9.0000% | 10.8000% | 13.5000% | 18.0000% |
| 100 | 10.0000% | 12.0000% | 15.0000% | 20.0000% |
| 110 | 11.0000% | 13.2000% | 16.5000% | 22.0000% |
| 120 | 12.0000% | 14.4000% | 18.0000% | 24.0000% |

| Expected Default Data | | |
|---|---|---|
| Current Volatility | Foreclosure Rate | Loss Percentage |
| 80 | 6.4000% | 7.6800% |
| 90 | 7.2000% | 8.6400% |
| 100 | 8.0000% | 9.6000% |
| 110 | 8.8000% | 10.5600% |
| 120 | 9.6000% | 11.5200% |

SYSTEMS, METHODS, AND COMPUTER-READABLE STORAGE MEDIA FOR CALCULATING A HOUSING VOLATILITY INDEX

This application is a division of application Ser. No. 12/621,065, filed Nov. 18, 2009, which is incorporated herein by reference.

BACKGROUND

I. Technical Field

The present disclosure generally relates to real estate markets. More particularly, the disclosure relates to systems, methods, and computer-readable storage media for calculating a housing volatility index from data reflecting changes in housing values over time.

II. Background Information

In the early 2000's, the U.S. housing market consistently exhibited increasing housing prices in most locations. In more recent years, the U.S. housing market has changed dramatically, and prices are falling at a rapid rate in some areas. While financial commentators often refer to today's housing market as "volatile," these assertions are merely based on human observations of housing price data by the commentators. They do not reflect a mathematical analysis of the volatility in the U.S. housing market, but rather simply reflect the commentator's impressions of volatility due to large observed swings in housing prices.

One of the reasons these assertions of volatility are not based on sound mathematical analysis is simply that there is no readily available measure of volatility of the housing market. While there are existing measures of volatility in other markets, for example the stock market, the inventors have determined that, apart from the present invention, there are no simple but robust techniques being used for calculating the volatility of housing markets. Furthermore, apart from the present invention, the inventors have determined that the methods that could be used are unable to use the house price transaction dataset directly without needing to first transform them into an index.

Accordingly, there is a need for a solution that provides a reliable measure of housing volatility. Moreover, there are numerous desirable applications for such a measure of housing volatility.

SUMMARY

Consistent with embodiments of the invention, computer-implemented methods, a computer system, and a computer-readable medium are provided.

A first computer-implemented method may include accessing, using a computing platform, stored property value data reflecting first values of real estate properties during a first time period and second values of the real estate properties during a second time period, the second time period being subsequent to the first time period; processing, using the computing platform, the property value data to identify the first values and the second values; calculating, using the computing platform, time intervals between dates of the first values and dates of the second values; calculating, using the computing platform, value changes of the real estate properties over the time intervals based on the first values and the second values; determining, using the computing platform, a volatility measure for the real estate properties based on the value changes of the real estate properties over the time intervals; and presenting, using the computing platform, the volatility measure to a user.

A computer system may include a volatility engine configured to: access stored property value data reflecting first values of real estate properties during a first time period and second values of the real estate properties during a second time period, the second time period being subsequent to the first time period; process the property value data to identify the first values and the second values; calculate time intervals between dates of the first values and dates of the second values; calculate value changes of the real estate properties over the time intervals based on the first values and the second values; determine a volatility measure for the real estate properties based on the value changes of the real estate properties over the time intervals; and present the volatility measure to a user, and a processor configured to execute the volatility engine.

A computer-readable medium may include instructions for causing a processor to implement a method comprising accessing stored property value data reflecting first values of real estate properties during a first time period and second values of the real estate properties during a second time period, the second time period being subsequent to the first time period; processing the property value data to identify the first values and the second values; calculating time intervals between dates of the first values and dates of the second values; calculating value changes of the real estate properties over the time intervals based on the first values and the second values; determining a volatility measure for the real estate properties based on the value changes of the real estate properties over the time intervals; and presenting the volatility measure to a user.

A second computer-implemented method may include identifying, using a computing platform, a target performance level for evaluating an automated valuation model, the target performance level reflecting a target performance of the automated valuation model at estimating values of real estate properties during a time period corresponding to a first level of volatility; determining, using the computing platform, a second level of housing volatility for which the automated valuation model is to be evaluated; adjusting, using the computing platform, the target performance level based on a relationship between the first level of housing volatility and the second level of housing volatility; accessing, using the computing platform, stored data reflecting performance of the automated valuation model during a time period corresponding to the second level of housing volatility; comparing, using the computing platform, the performance of the automated valuation model to the adjusted target performance level; and producing, using the computing platform, an indication of accuracy of the automated valuation model from an output of the comparing.

A third computer-implemented method may include identifying, using a computing platform, a first dispersion level of a forward pricing model, the first dispersion level reflecting an expected dispersion of predicted property values by the forward pricing model from actual property values, the first dispersion level corresponding to a first level of housing volatility; determining, using the computing platform, a second level of housing volatility for which a second dispersion level is desired; calculating, using the computing platform, a second dispersion level based on the first dispersion level and reflecting a relationship between the first level of housing volatility and the second level of housing volatility; and outputting, using the computing platform, data reflecting the second dispersion level.

A fourth computer-implemented method may include identifying, using a computing platform, a base level of housing volatility associated with a base time period and a corresponding base level of foreclosure losses associated with the base time period; determining, using the computing platform, a second level of housing volatility associated with a second time period; calculating, using the computing platform, a factor representing a relationship between the base level of housing volatility and the second level of housing volatility; adjusting, using the computing platform, the base level of foreclosure losses in accordance with the factor to generate an estimated second level of foreclosure losses associated with the second time period; and outputting, using the computing platform, data reflecting the second level of foreclosure losses.

A fifth computer-implemented method may include identifying, using a computing platform, a market price for an option on a security, the security relating to loans on one or more underlying real estate properties; identifying, using the computing platform, an option period for the option, the option period being a period during which the security can be bought or sold for a strike price; determining, using the computing platform, a real estate market volatility corresponding to the underlying real estate properties for the security; and estimating, using the computing platform, a volatility-adjusted value for the security based on the real estate market volatility. Similarly, the method could be used for an option on the future value of the volatility index, to hedge against housing market volatility.

A sixth computer-implemented method may include storing, using a computing platform, option data reflecting a strike price for an option on a housing volatility index; providing, using the computing platform, the option data to a user; receiving, using the computing platform, a request from the user to purchase the option; receiving, using the computing platform, a request from the user to exercise the option; and settling the option, using the computing platform, based on at least a difference between the strike price and a value of the housing volatility index.

It is to be understood that both the foregoing general description and the following detailed description are exemplary and explanatory only and are not restrictive of the invention or embodiments thereof, as claimed.

BRIEF DESCRIPTION OF THE DRAWINGS

The accompanying drawings, which are incorporated in and constitute a part of this disclosure, illustrate various embodiments and aspects of the present invention. In the drawings:

FIG. 2 illustrates an exemplary data table, consistent with certain embodiments of the invention.

FIG. 4 illustrates an exemplary data table, consistent with certain embodiments of the invention.

FIG. 5 illustrates an exemplary data table, consistent with certain embodiments of the invention.

FIG. 8A illustrates an exemplary data table, consistent with certain embodiments of the invention.

FIG. 8B illustrates an exemplary data table, consistent with certain embodiments of the invention.

FIG. 10 illustrates an exemplary data table, consistent with certain embodiments of the invention.

FIG. 13 illustrates an exemplary data table, consistent with certain embodiments of the invention.

DETAILED DESCRIPTION

Reference will now be made in detail to the exemplary embodiments of the invention, examples of which are illustrated in the accompanying drawings. Wherever convenient, the same reference numbers will be used throughout the drawings to refer to the same or like parts.

Figure 1:
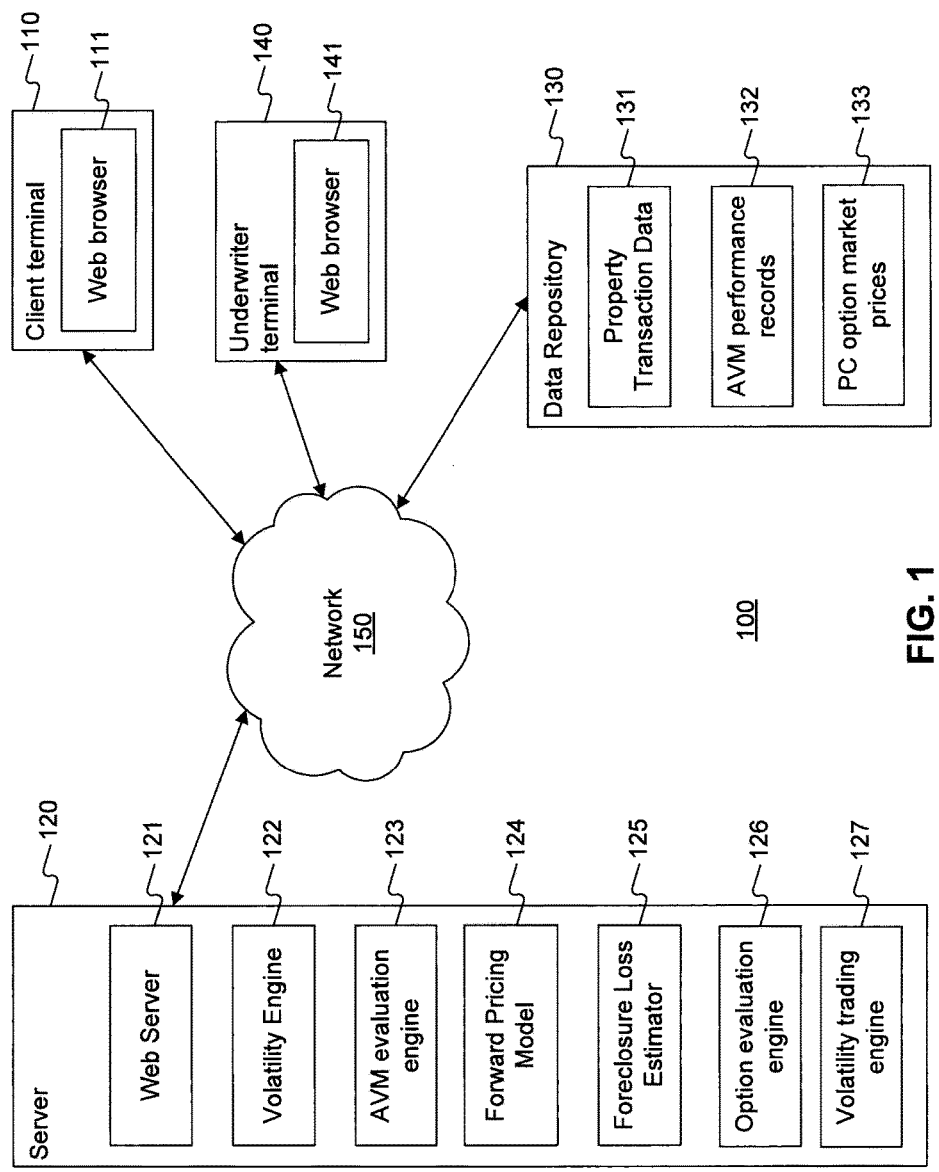
FIG. 1 is a block diagram of an exemplary system, consistent with certain embodiments of the invention.

FIG. 1 illustrates a block diagram of an exemplary system environment that comprises a computer system 100, consistent with an embodiment of the invention. Computer system 100 may include a server 120 running web server 121, as well as numerous other applications, such as a volatility engine 122. Volatility engine 122 may communicate with data repository 130 over network 150 to access property transaction data 131, which includes records of real estate property sales. Volatility engine 122 may process property transaction data 131 to respond to various requests by a user at client terminal 110, and provide the requested data to the user by transmitting web pages to the user over network 150. Thus, system 100, and in particular server 120, may serve as a computing platform for calculating a housing volatility index using volatility engine 122.

Underwriter terminal 140 may provide option data to volatility trading engine 127, and the user at client terminal 110 may purchase and exercise options by communicating with server 120. For example, volatility engine 122 may calculate a housing market volatility index based on property transaction data 131, and provide the housing market volatility index to the user by sending web pages to web browser 111. In such embodiments, system 100, and in particular server 120, may serve as a computing platform for trading directly on a housing volatility index.

Although FIG. 1 shows a particular number and arrangement of components, other arrangements and numbers of components could be used to implement embodiments of the invention. For example, there may be various numbers of client terminals 110, servers 120, data repositories 130, and underwriter terminals 140. Client terminal 110, server 120, and data repository 130, and underwriter terminal 140 may be general-purpose computers including one or more processors, memory, and storage devices. Network 150 may be a wired or wireless network or any combination thereof, such as a home or office LAN in communication with the Internet.

Communications over network 150 may be formatted according to the Hypertext Transfer Protocol (HTTP). For a more secure communications, Hypertext Transfer Protocol over Secure Socket Layer (HTTPS) may also be used.

Server 120 and data repository 130 may operate by accepting requests from client terminal 110 and providing an HTTP response. Resources such as web applications and web pages available from server 120 may be accessed using HTTP. The HTTP communications be implemented over one or more TCP/IP connections, or using other suitable networking protocols such as UDP.

In some embodiments, the various applications on server 120 may be implemented as software executing on a processor in server 120. In such embodiments, the software may take the form of instructions embodied on one or more computer-readable media accessible by server 120, such as a main memory in server 120. In other embodiments, the various applications on server 120 may be wholly embodied as hardware components, such as field programmable gate arrays (FPGAs) or application-specific integrated circuits (ASICs). In still further embodiments, steps performed by each of the disclosed applications may be embodied as combinations of hardware components and software components.

FIG. 2 illustrates an example of property transactions data 131, stored by data repository 130, in more detail. Property transactions data 131 may include records of home sales and corresponding prices for any geographical region and time period for which data is available. For ease of understanding, property transaction data 131 is illustrated to include only two sales transactions for each property, and accordingly includes a price and date for each of the two transactions. However, property transaction data may reflect any number of transactions for each property.

Further, for simplicity, each property listed in property transaction data 131 is located in a single county ("county 1") in Virginia. Thus, in property transaction data 131, the geographical subregion for each property is uniquely identified by a combination of county and state. However, property transaction data 131 may include records of home transactions for the entire United States, and accordingly may include home sales data for any combination of county and state for which data is available. Thus, embodiments where the properties are located in multiple counties and states will also be described.

In some embodiments, property transaction data 131 maybe organized by other types of subregions, rather than by county and state. For example, property transaction data 131 may be organized by the state where the properties are located, without identifying the county where a property is located. Alternately, each county in the United States may be given a unique identifier, and property transaction data 131 may identify each county by the unique identifier rather than by a combination of state and county. In other embodiments, geographical regions can be identified by metropolitan statistical areas (MSAs), cities, towns, zip codes, time zones, or any other suitable means of classifying where a property is located.

Figure 3:
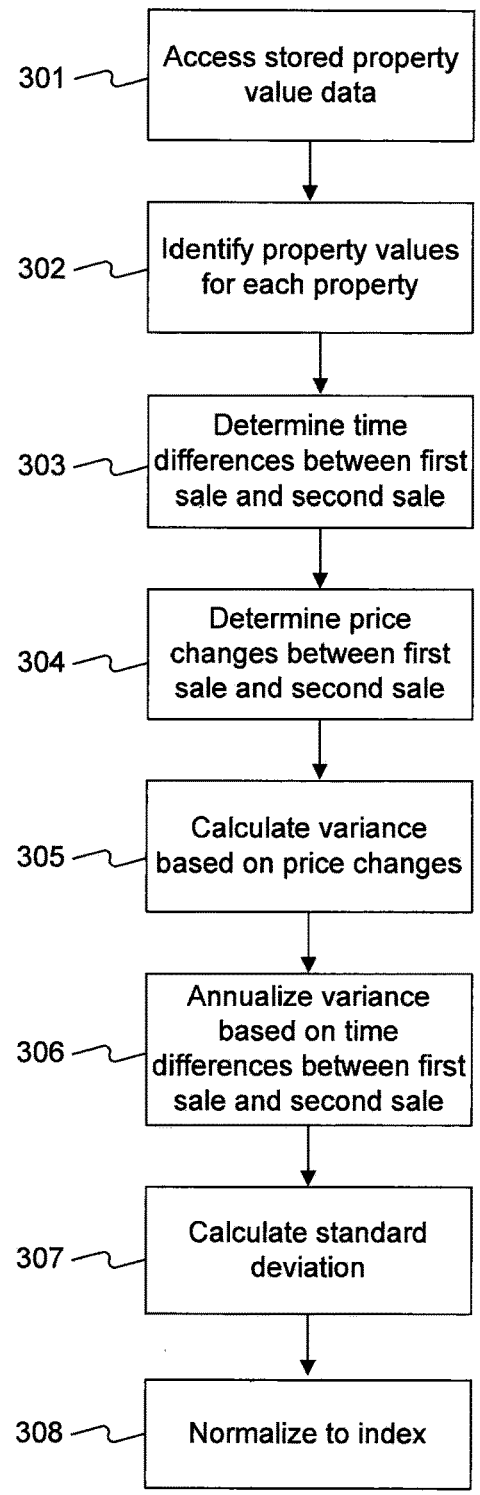
FIG. 3 is a flowchart of an exemplary method, consistent with certain embodiments of the invention.

FIG. 3 is an exemplary flowchart of a method 300, consistent with an embodiment of the invention. Method 300 may be used for creating a housing market volatility index. As discussed below, in one embodiment, method 300 can be used a single time to calculate a one-time volatility index for a particular six month period. Over time, method 300 can be applied repeatedly to generate a series of rolling volatility measurements of the housing market.

As discussed, property transaction data 131 is illustrated for simplicity to include only data for a single county in Virginia. As shown in FIG. 2, property transaction data 131 includes price and date columns for an earlier and a later transaction for each property. These columns are labeled date 1 and price 1 for the earlier transaction, and date 2 and price 2 for the later transaction. Note that all of the earlier transactions shown in FIG. 2 took place in 2002, while all of the later transactions took place during the six month period from December of 2008 to May of 2009.

In some embodiments, a home volatility index for a given month is calculated for a given county by considering all of the properties that have sold within the county during the preceding six months. A simple example of calculating a housing volatility index for the six month period ending in May of 2009 follows. Further, this example is based solely on a set of transactions in a single county in Virginia, where the first transactions all took place within the same year, 2002.

As shown in FIG. 3, method 300 starts with step S301 by accessing stored property value data. For example, server 120 may transmit a request for property value data to data repository 130, and data repository 130 may respond by sending property transaction data 131 to server 120. In some embodiments, server 120 may access a local copy of property transaction data 131, and periodically receive updates to property transaction data 131 from data repository 130. In other embodiments, server 120 may specify which data is requested from data repository 130 in the request, for example by limiting the request to certain date ranges or geographical subregions.

As discussed, property transaction data 131 includes data reflecting multiple transactions per property. Thus, property transaction data 131 includes "repeat sales" data, i.e. an earlier sale of each property during a first time period (2002), and at least one later sale of the property during a later time period (December 2008 through May 2009). Accordingly, property transaction data 131 can be used to discern the change in prices over time for each property. As an example, FIG. 2 shows that 123 Pear Street sold for $100,000 in January of 2002, and later sold for $110,000 in May of 2009.

Once server 120 has accessed property transaction data 131, method 300 moves to step S302. At step S302, volatility engine 121 on server 120 identifies property values for the properties reflected in property transaction data 131. For example, volatility engine may identify two property values for each property, i.e. the price for the first transaction (when the property was sold at date 1) and a later price for the second transaction (when the property was sold at date 2). Server 120 may use a combination of the property address, zip code, state, and county to uniquely identify each property. In other embodiments, unique numerical identifiers can be used for each property as a primary key of property transaction data 131. In still further embodiments, plat and/or lot numbers for a particular county, subdivision, or other locality may be used to individually identify each property.

Once the property values for the first and second transactions are determined, method moves to step S303. At step S303, volatility engine 121 determines the time difference between each transaction reflected in property transaction data 131. As illustrated in FIG. 4, volatility engine 121 may calculate the time differences in months, and store the calculated time differences in a volatility table 400 locally on server 120. Thus, as shown in FIG. 4, volatility engine 122 calculates a value of 88 months for 123 Pear Street, i.e. the time in months between the first transaction in January of 2002 and the second transaction in May of 2009.

At this point, method 300 moves to step S304, and volatility engine 122 calculates a relationship between the transaction prices reflected in property transaction data 131 for each property. For example, volatility engine 122 may take the log of the ratio between the two prices and store this value in volatility table 400. As illustrated in FIG. 4, this value is approximately 0.0953 for 123 Pear St., i.e. ln($110,000/$100,000). Thus, the log of the price ratio is a measurement of how much prices have changed for each property during the time between each transaction.

Once the log ratios of the prices are calculated, method 300 moves to step S305, and volatility engine 122 calculates the variance of the log ratios for the properties, and stores the calculated variance in volatility table 400. For example, as shown in FIG. 4, the variance in the log ratios for the four properties illustrated in FIG. 2 is approximately 0.0108.

As understood by those skilled in the art, various factors can influence the variance in a data set that reflects property values. One factor is market volatility—in a volatile market, one would expect to see relatively large variances in the log ratios of prices for given properties over a short period of time. However, another factor that can affect the variance is time—as time passes, the variance in the distribution of log ratios will increase even if the housing market is not particularly volatile. Thus, even in a relatively stable housing market, one expects to see relatively large variances over long periods of time in the log ratios of housing prices.

In order to account for the effect of time on the variance calculated at step S305, volatility engine 122 standardizes the variances to a fixed time period at step S306. For example, the variance may be annualized, i.e. standardized to a period of one year, by dividing the variance by the average number of months between transactions (82), and then dividing the result by 12. As shown in FIG. 4, the annualized variance for the four properties is approximately 0.0016.

One way to interpret the annualized variance is to view the total variance of the data set, i.e. approximately 0.0108, as having accumulated at an average rate of 0.0016 per year. In other words, given the average difference between transactions of 82 months, one can say that on average, the variance of the data set increased by 0.0016 per year. By standardizing the variance to a fixed time period in this manner, embodiments consistent with the invention can account for the effect of time on the home prices. Thus, the annualized variances may therefore be directly compared to determine market volatility. Moreover, by annualizing the variances at step S306, embodiments consistent with the invention can compare the sample of property transaction data 131 shown in FIG. 2 with other data sets that reflect shorter or longer time periods between transactions. This will be discussed in more detail later.

In the embodiment shown, once the variance of the log ratios of the prices is annualized, method 300 moves to step S307, and volatility engine 122 calculates a standard deviation from the annualized variance. Volatility engine 122 may do so by calculating the square root of the annualized variance determined at step S306. As shown in FIG. 4, volatility engine 122 may store the calculated standard deviation, approximately 0.0397, in volatility table 400. At this point, volatility engine 122 has a standard deviation of the log ratios of price changes of the homes from year to year.

The annualized variances or standard deviations discussed above could be used to directly evaluate how volatile home prices are in county 1 of Virginia as of May 2009. For example, one could simply compare the annualized variance or standard deviations for county 1 of Virginia in May of 2009 to annualized variances or standard deviations for other geographical areas or time periods. This comparison would reveal how volatile home prices are relative to the other geographical areas or time periods. However, working in units such as these relatively small decimal numbers is not necessarily convenient for a human user.

Accordingly, method 300 moves next to step S308, and volatility engine 122 normalizes the standard deviation to an index in order to make the annualized standard deviation easier to interpret. For example, assume that in January of 2000, method 300 was performed on transactions for the entire United States. Further assume, as shown in FIG. 4, that a standard deviation of 0.02911 was calculated for January of 2000 for the entire country. Volatility engine 122 may use January of 2000 as a "base" year for calculating the index. System 100 can do so by dividing the standard deviation calculated in May of 2009 (0.03971) by the standard deviation calculated for January of 2000, and multiplying the result by 100 to get a value of 136.41. Thus, based on this result, one can say that housing prices in county 1 of Virginia in May of 2009 are approximately 1.36 times more volatile than they were for the overall United States market in January of 2000.

Rolling Index

In the example discussed above, each of the second transactions occurred between December of 2008 and May of 2009. Thus, the index for May of 2009 was calculated based on all of the transactions for the preceding six-month period. In order to calculate the index for June of 2009, method 300 may be performed on data for the six-month period between January of 2009 and June of 2009. Accordingly, method 300 would not include 159 Grape St. in the calculation of the index for June 2009, because 159 Grape St. does not fall within the preceding six months. Likewise, if one or more properties sold in county 1 of Virginia during June of 2009, these transactions would be accounted for in the June 2009 index, but would not be considered in calculating the May 2009 index.

The six month rolling window discussed above is but one of numerous possible implementations. Given enough data, a volatility index can be calculated for any interval of time, even daily. Generally speaking, it may be desirable to use a rolling window size of sufficient duration to encompass a relatively large data set. This will tend to smooth out or reduce spikes in the calculated indices, which in turn will result in easier and more meaningful comparisons between volatilities calculated for different time periods.

First Transactions Across Multiple Time Periods

In the example discussed above, the first transactions all fell within the same year, i.e. 2002. In some embodiments, property transaction data 131 may reflect first property transactions that occurred in different years, e.g. transactions from 2000, 2001, etc. In such embodiments, one or more steps of method 300 may be applied to generate separate indices on a year-by-year basis. For example, several indices could be calculated for May of 2009, e.g. a first index for all the properties where the first transaction fell in the year 2000, and separate indices for all the properties where the first transactions fell in subsequent years 2001, 2002, 2003, etc.

By calculating separate indices in the manner described above, it is possible to compare home price volatility within a given area based on the time when the first transaction occurred, which in turn may serve as a proxy for how long the previous owner held on to the property before selling. As an example, assume that method 300 is performed for a number of properties where the first transaction occurred in the year 2000, and the second transaction occurred between December 2008 and May 2009.

Assume the index value for the properties with first transactions occurring in 2000 is approximately 100. Thus, one can say that for these homes where the previous owners owned the homes for about 9 years (2000-2009) the volatility in home prices was approximately the same as that for the entire country as of January of 2000. Now assume system 100 uses a different subset of the data to perform method 300 again, this time on the properties where the first transaction occurred in 2006. If the calculated index for first transactions in 2006 turns out to be 150, one can say that, for those homes where the previous owners only owned the home for 3 years, the prices are approximately 50% more volatile than for homes where the previous owners owned the homes for 9 years. By calculating indices on subsets of property transaction data 131 in this manner, one can develop some insight into how housing price volatility is influenced by the amount of time previous owners have held on to properties.

As noted above, a six-month rolling window for the housing index is exemplary, and an index could be calculated for second transactions occurring over shorter or longer intervals. Similarly, the earlier transactions used by method 300 are not confined to periods of one year. Method 300 could calculate indices for properties where all the first transactions occurred within a particular month, 6 months, decade, etc. As discussed above with respect to the rolling 6-month window, the size of the first transaction interval may also be dependent on the amount of data available. In some embodiments, the rolling window and first transaction interval may be initially defined to 6 months and a year, respectively, and automatically resized based on the amount of available data.

Multiple Counties

In the example discussed above, a single county in Virginia was considered to make the example easy to follow. Also presented above is a description of how an up-to-date rolling index could be calculated for a given location by considering sales in the location over consecutive periods of six months. However, property transaction data 131 may include data for multiple counties in multiple states. In such embodiments, method 300 may be performed separately to obtain a volatility index for each county in the U.S. By applying method 300 in this manner, it is possible to compare housing volatility for different locations.

As an example, assume that a user at terminal 110 requests to compare housing volatility for May of 2009 between county 1 and county 2 in Arizona. Client terminal 110 may transmit a request to server 120, and volatility engine 122 may in turn request property transaction data 131 for these two counties from data repository 130. Volatility engine 122 may then perform method 300 on the property transaction data for each county.

Assume the housing volatility index for May 2009 in county 1, AZ is 200, while the May 2009 index for county 2, AZ is 400. One can say that prices in county 1 are approximately twice as volatile compared to prices in the overall U.S. in January of 2000. Moreover, one can say that prices in county 2 in May of 2009 are even more volatile still, approximately twice as volatile as the prices in county 1 during the same time period, and four times as volatile as for the entire U.S. in January of 2000. Thus, by applying method 300 on a county-by-county basis, one can compare housing volatility between different locations.

Weighted National Index

In the discussion above, a home volatility index was calculated for individual counties, and a rolling index was created for each county to show variations in volatility over time. However, it may also be useful to calculate a home volatility index for a larger geographical region, such as a particular state or the entire U.S. As an example, one approach to creating a national home volatility index would be to calculate a housing volatility index for each county in the U.S., and then calculate the mean (or median or mode) for the set of calculated indices.

This approach may be problematic, however, because it does not account for the fact that more transactions occur in some counties than in others. Thus, counties with fewer property sales during a given time period would tend to be overrepresented by simply calculating the mean index, and counties with more property sales would tend to be underrepresented. One embodiment consistent with the invention solve this problem by weighting the national index by the number of transactions in each county.

A similar problem can occur with multiple indices that are calculated for different years based on the year when the first transaction occurred. As discussed above, an index for a particular county could be calculated for all the properties where the first transaction occurred in 2000, and a separate index could be calculated for other years when first transactions occurred, e.g. 2001, 2002, etc. Again, system 100 could simply calculate a mean index for a particular county by adding up the indices for all of the years of previous sales, and dividing by the number of years worth of data. However, this approach does not account for the fact that, in some years, each county may have had far more sales than in other years. One embodiment consistent with the invention solves this problem by weighting the national index by the number of first transactions occurring within a given year.

FIG. 5 illustrates a weighted volatility table 500 that implements a weighting scheme to account for the situations discussed above. To calculate weighted volatility table 500, volatility engine 122 performs steps similar to those described above with respect to method 300. However, volatility engine may 122 first sort property transaction data 131 by county, and then within each county may further sort the transaction data by the number of years since the first transaction. Volatility engine 122 then calculates an annualized variance for each time period within each county.

As shown in FIG. 5, the annualized variance for those homes with first transactions occurring within the past year in county 1 in Virginia is 0.00132. Similarly, the annualized variance for those homes with first transactions occurring at least two years ago but more than one year ago is approximately 0.00130. Similar calculations are done on a county-by-county and time-period-by-time-period basis to generate weighted volatility table 500.

As volatility engine 122 is calculating annualized variances for each time period/county combination, volatility engine 122 also tracks the number of transactions for each time period/county combination. As an example, in county 1 of Virginia, 5 of the earlier transactions occurred within the preceding year, whereas for county 2, 9 of the first transactions occurred within the preceding year. Likewise, there were 6 first transactions at least one year ago and no more than two years ago for county 1 in Virginia, whereas there were 3 such transactions for county 2 in Virginia.

Once volatility engine 122 has determined the number of transactions for each previous time period/county combination, system 100 may calculate an aggregate national weighted variance by weighting the annualized variance for each previous time period/county combination by the corresponding number of transactions. An example of this weighted aggregated national weighted variance is shown in FIG. 5 as 0.0015415. The square root of this value can be taken to determine a national weighted standard deviation, shown in FIG. 5 as approximately 0.0393. As discussed above, system 100 can divide this number by the base national standard deviation for January 2000 and multiply by 100 to calculate a national index of 134.8727.

Figure 6:
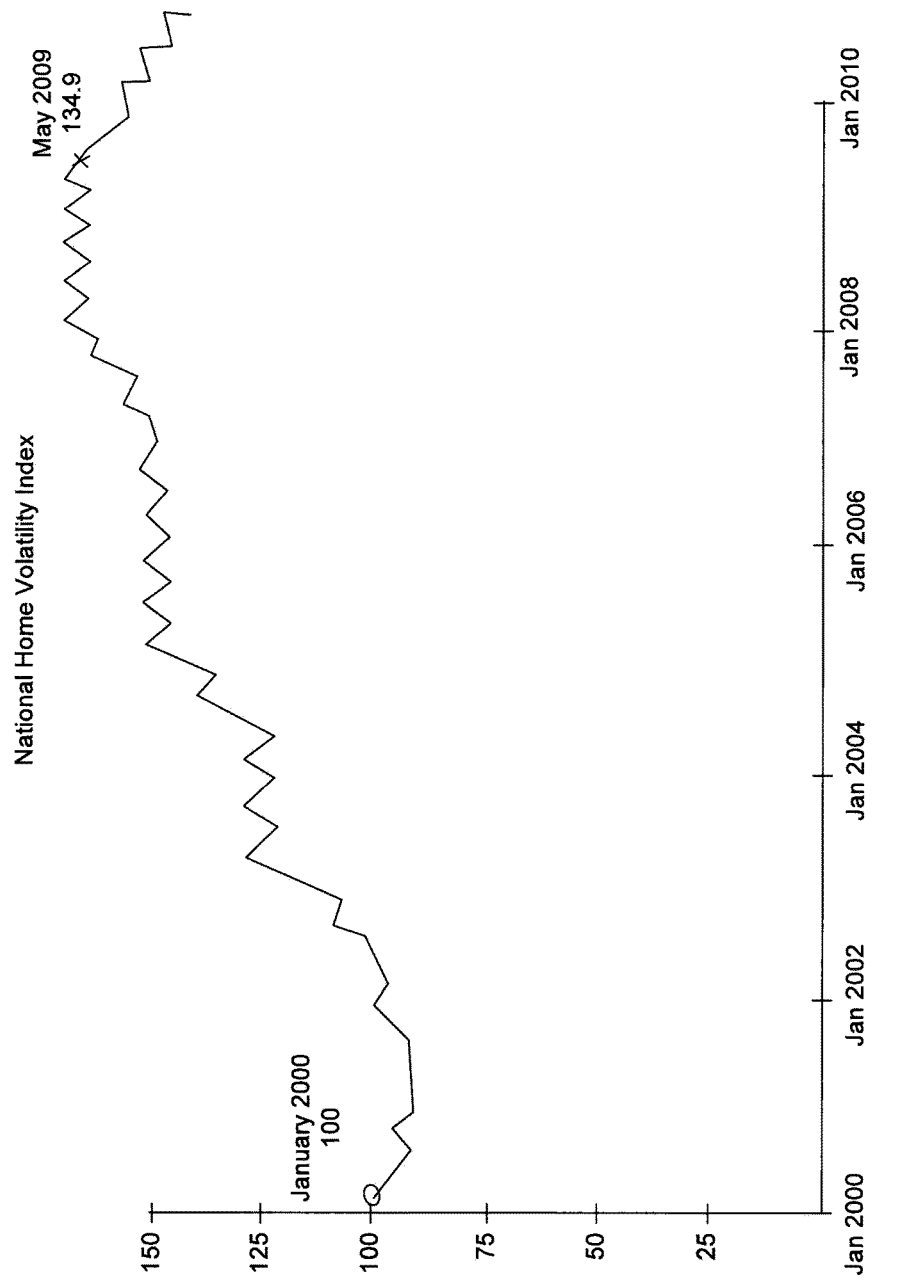
FIG. 6 illustrates an exemplary graph, consistent with certain embodiments of the invention.

Moreover, embodiments consistent with the invention can perform method 300 over a number of iterations to generate a rolling index. FIG. 6 illustrates an exemplary national home volatility index graph 600, representing a national home volatility index from the base month of January 2000 until January of 2010. Assume, for purposes of this example, that national home volatility graph 600 is generated in January of 2010. In FIG. 6, an oval represents the base index value of 100, and an x is used to represent May of 2009. Thus, graph 600 demonstrates that home volatility generally trended upward from approximately 2002 through 2009.

In some embodiments, a user at client terminal 110 may request a national home volatility graph 600. Volatility engine 122 may then request property transaction data 131 from data repository 130, and calculate a series of rolling indices beginning in January of 2000, for this example. Volatility engine 122 may then create a web page with a graphic illustrating national home volatility graph 600, and send the web page to client terminal 110 in response to the user's request. Any of the other variations on volatility indices discussed above, such as various locations or time periods, can also be graphed and sent to the user in a similar manner.

As discussed, using the weighting scheme described above, method 300 can be applied to calculate a national index that is weighted to account for the number of transactions in each county in each time period. FIG. 5 shows that the national index of approximately 134.9 indicates that home prices are roughly 35% more volatile in May of 2009 for the entire United States than they were in January of 2000. Likewise, referring back to FIG. 4, volatility table 400 shows that home prices in county 1 in Virginia are slightly more volatile than prices nationally in May 2009, with an index of approximately 136.4 compared to the national index of 134.9.

In some circumstances, the data in property transaction data 131 may be relatively sparse for a particular county and time period combination. In such circumstances, certain embodiments omit these county/time period combinations from the calculation of the weighted index, to prevent them from skewing the index.

In addition, certain embodiments may weight the national variance by various other measures, rather than the number of transactions in a given county. For example, the census count in a particular county could be used to calculate the weighted national variance. This approach would tend to weight areas with higher populations more heavily, even when those areas have relatively few transactions. Similarly, the total number of properties in a county could be used for weighting purposes. This approach would tend to weight counties with a higher number of properties more heavily, as opposed to counties that may have fewer properties but more frequent transactions.

In some embodiments, stochastic techniques are used to reduce the amount of computation required to calculate a volatility index. For example, an embodiment may sample some subset of the property transactions over a given period and create an index based on the sample, rather than using all of the data in property transaction data 131. When using stochastic techniques rather than using every available property transaction, weighting schemes can still be applied as discussed above.

In the embodiments discussed above, the examples simply assumed that volatility could be normalized to a period of one year, based on the implicit assumption that price changes accumulated at a constant rate over the five year period between the two transactions. However, this may not necessarily be the case. For example, consider a first property where the first transaction occurred within the previous year, and a second property where the first transaction occurred five years ago. The second property has five years worth of cumulative price changes reflected in the most recent sales price, and the most recent sales price does not reveal how much of the price difference is due to pricing volatility in the past year. In contrast, it is clear that all of the price changes in the first property have occurred within the past year. Thus, the price changes for the first property may provide more information about the housing volatility in the past year, because the data for the first property is undiluted by price changes that occurred in previous years.

Thus, in further embodiments, properties with more recent first transactions may be weighted more heavily than properties with earlier first transactions. When calculating weighted volatility table 500, the annualized variance for each time period/county combination can be multiplied by a weight that decreases as the time difference for the first transaction increases. For example, for properties where the first transaction occurred within the past year, a weight of 1 could be used, if the first transaction occurred more than one year ago but within the past two years, a weight of 0.9 could be used, for more than two years but within the past three years, a weight of 0.8, etc. By weighting the annualized variance for each time period in this way, properties with more recent first transactions will have more influence on the final value of the national index.

Geographical Variations

In the embodiments discussed above, a county was used as a geographical subregion of interest for method 300, and a national index was created by aggregating the data for each county. However, as discussed above, certain embodiments may use any geographical subregion for which data is available for the calculations disclosed for method 300—cities, towns, states, metropolitan statistical areas, zip codes, time zones, etc.

Moreover, a weighted index can be calculated for any geographical region composed of such subregions. For example, volatility engine 122 may request only the data for the state of Virginia in step S301 of method 300. Volatility engine 122 may then perform the various steps discussed above to generate annualized variances for each county/year combination in Virginia, and generate a single weighted variance, standard deviation, and index for the state of Virginia.

Likewise, provided there is sufficient data, some embodiments may break down property transaction data 131 into more refined locations, such as by zip code. There may be several zip codes within a given county of interest. Volatility engine 122 may perform the various steps discussed above to request only the data for a particular county from data repository 130. Volatility engine 122 may then process the data on a zip code by zip code (rather than county) basis to generate annualized variances for each zip code/year combination. Volatility engine 122 may then weight the annualized variances by the number of transactions per zip code/year combination to create a weighted county variance, weighted county standard deviation, and weighted county index.

Volatility by Property Type or Loan Type

Just as a home volatility price index can be calculated for different geographical locations and for different time periods, certain embodiments may calculate a home volatility price index for particular property or loan types. For example, property transaction data 131 may include additional fields (not shown) indicating that a property is of a particular type—condo, townhouse, commercial, farm, beach, vacation, single family, rental property, etc. A home volatility price index could then be calculated for properties of a particular type.

As an example, consider the case where the volatility index for vacation properties tends to be higher than for single family homes serving as primary residences, which tends to occur in a poor economic climate. This might be the case because home owners may choose to first sell their vacation properties at distressed prices before selling their primary homes. As another example, consider the case where condominium prices in a city consistently exhibit lower volatility than prices of single family homes in the surrounding metro area.

Embodiments consistent with the invention may also calculate a home price volatility index for particular loan types. For example, property transaction data 131 may include additional fields indicating that a property is currently owned under a particular loan type—for example, 30-year fixed conforming mortgage, 10- or 15-year fixed rate mortgages, adjustable-rate mortgages (ARMS) of various durations, subprime loans, jumbo loans, or alternative documentation loans, etc. By using system 100 to calculate a home value index for properties owned under different types of loan arrangements, one can gain insight into how volatile home prices tend to be for particular types of lenders/borrowers.

For example, system 100 may output a volatility index indicating that ARM loans with short fixed-rate durations tend to exhibit rather high volatility compared with a corresponding index for fixed-rate 30-year loans. This may reflect a situation where many home buyers with short-duration ARM loans become unable to afford the property once the rate resets for the first time, and do not have sufficient time to wait out a poor economy or real estate market to avoid selling at a distressed price. In contrast, system 100 may also output an index indicating that 30 year fixed loans are better able to ride out poor housing markets, due to the predictable nature of their payments or perhaps other factors.

A home volatility index generated by method 300 may also be useful for understanding differences in certain segments of the housing market. Not all vacation properties, or properties purchased with ARM loans, will necessarily exhibit the same behavior. As an example, system 100 may calculate a home price volatility index for a number of vacation properties in a particular resort town reflecting a high volatility, such as an index score of 150. However, a deeper analysis might reveal that most of the vacation properties in the resort were purchased in recent years with short-duration ARM loans, and that these properties alone are responsible for much of the volatility of home prices in the resort town. Thus, if system 100 were used to calculate a volatility index for only those vacation properties bought with short-term ARM loans, the output may show a much higher index score of 180. Conversely, calculating a volatility index for vacation properties bought with 30-year fixed loans might show a much more predictable behavior, for example an index score of 110. This analysis would suggest that much of the volatility in vacation home prices is due to the ARM loans used to purchase them, rather than an inherent volatility associated with vacation home prices.

Other Bases for Indices

The embodiments discussed above used the national weighted standard deviation from January of 2000 as a "base" for the various indices calculated. Thus, each index calculated provided some information about how volatile the housing market in particular combinations of county/state/time period was in comparison to the national market as of January of 2000.

However, embodiments consistent with the invention may also use other bases for calculating the index, depending on what comparisons a user is interested in. For example, a user may be only interested in how the housing market in May of 2009 for county 1 of Virginia compares to the housing market for county 1 of Virginia in January of 2000, rather than for the national housing market as a whole in January of 2000. In such a case, system 100 can be adjusted to use only the standard deviation for county 1 of Virginia as of January of 2000 to calculate the index, rather than the standard deviation for the entire United States. This is true for any set property characteristics for which system 100 has such data—system 100 can be adjusted to use a convenient "base" index for comparison and then generate a volatility index for the data of interest using method 300, as discussed above.

Evaluating Automated Valuation Models

In some embodiments, property transaction data 131 may include values based on methods other than repeat sales. For example, property appraisals or other estimates of home values may be substituted for actual sales data. Alternately, automated valuation models ("AVMs") may be used to calculate the home values in property transaction data 131. In embodiments where appraisals or automated valuations are used in place of repeat sales data, volatility engine 121 may implement method 300 by calculating the duration between appraisals or automated valuations, rather than the duration between sales.

However, use of actual home sales data has several advantages. For example, even an experienced home appraiser may have a difficult time accurately gauging the value of a particular property in a highly volatile market. Likewise, models such as AVMs tend to become less accurate at estimating housing values when volatility is high. Indeed, it is often difficult to tell whether poor performance by an AVM is due to a flawed model, or simply due to a highly volatile housing market. Even a very robust AVM may not be expected to consistently provide accurate assessments of housing prices in a very volatile market, because the market itself is not predictable. Likewise, even a relatively poor AVM may tend to generate fairly accurate results when housing volatility is very low.

Thus, inaccurate results produced by an AVM can be caused by at least two fundamentally different problems—an inaccurate model, or a volatile housing market. However, because the housing volatility index provides us with a means of quantifying the volatility in the housing market, we are in a better position to evaluate the performance of an AVM. Where market volatility is high, we expect some degradation in the performance of even relatively robust AVMs, and can adjust our performance expectations accordingly. However, if market volatility is low, inaccurate value estimates by a particular AVM suggest that the underlying methodology of the AVM is at fault, because the market itself is fairly predictable.

Effective evaluations of AVMs may be particularly important for certain parties, such as lenders. AVMs may be used to inform decisions such as whether to approve a mortgage loan for a particular property. For example, if a lender uses an AVM that suggests that the property is worth less than the requested loan, the lender may decide not to grant the loan. Conversely, where the AVM suggests the property is worth substantially more than the loan, the lender may feel secure in granting a loan secured by the property. However, this approach to lending is only safe and profitable when the underlying AVM is accurate.

Figure 7:
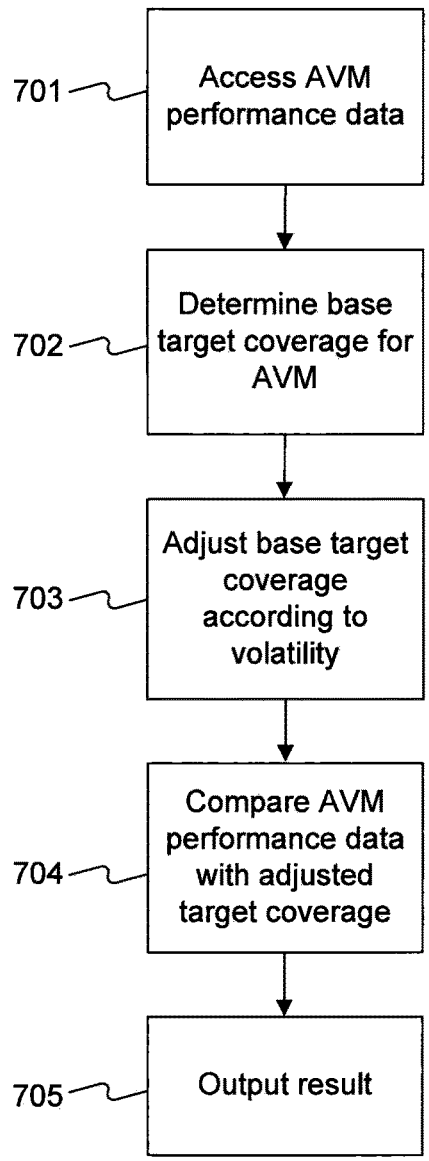
FIG. 7 is a flowchart of an exemplary method, consistent with certain embodiments of the invention.

As shown in the embodiment of FIG. 1, server 120 may also include an AVM evaluation engine 123 configured to evaluate various AVMs. FIG. 7 illustrates a method 700 for evaluating AVM performance. As discussed below, method 700 evaluates various AVMs based on an expected level of performance, uses the housing volatility index discussed above to adjust the expected level of performance.

Method 700 beings at step S701, where AVM evaluation engine 123 accesses AVM performance data 800 (shown in FIG. 8A) stored on data repository 130. AVM performance data 800 may include performance data for a number of different AVMs, in this case AVMs 1, 2, and 3. AVM performance data 800 may reflect the accuracy of each respective AVM at predicting the values of homes during various time periods.

In one embodiment, AVM performance data 800 may be derived as follows. First, each AVM is run to estimate values of a number of different properties. Then, system 100 accesses home value data such as property transaction data 131, and determines the differences between the estimated values generated by the AVMs and the actual sale prices. If an AVM estimates the price of a given property to within some predefined window of accuracy, e.g. a "target confidence" of perhaps +/−10%, the AVM can be said to have accurately estimated the value of the property. Conversely, if the AVM estimate differs by more than the target confidence of 10% from the actual sale price of a given property, the AVM may be considered to have inaccurately estimated the value of the property. In some embodiments, the target confidence is varied from +/−10% to other suitable ranges, depending on the AVM and the needs of the user.

For any given data set, each AVM will accurately assess a certain percentage of property values within the target confidence, and will usually also provide estimates that are outside the target confidence. As shown in FIG. 8A, for any given period of time, the percentage of estimates that fall within our target confidence may be stored in AVM performance data 800. For example, referring to FIG. 8A, in the month of June 2009, AVM 1 estimated 76% of property values within 10% of their actual sale prices. Similarly, AVM 3 estimated 77% of property values within 10% of their actual sales prices in August of 2009.

Once AVM evaluation engine 123 has accessed AVM performance data 800 for various AVM/time period combinations, method 700 moves to step S702. At step S702, AVM evaluation engine 123 determines a base "target coverage" for the AVMs. The "coverage" of a given AVM at any particular time is the percentage of value estimates by the AVM that fall within the target confidence. Thus, if a given AVM estimates the price of 100 properties in May of 2009, and 90 of the estimates are within 10% of the actual sale price, the AVM has 90% coverage.

In order to evaluate an AVM, system 100 may first establish a target coverage, which is an expected or desired percentage of property value estimates by each of the AVMs that are expected to fall within the target confidence. As discussed below, system 100 may vary the target coverage depending on the volatility of the housing market to account for the relative predictability of housing prices. Before adjusting the target coverage for an AVM, system 100 may first define a "base" target coverage as of January of 2000. As the housing volatility index exceeds 100, system 100 can decrease the target coverage to compensate for the expectation that AVMs will perform at a degraded level in more volatile markets. Likewise, system 100 may increase the target coverage as the volatility index drops below 100, because one could expect more accurate results from the AVM in a more predictable market.

FIG. 8B illustrates an exemplary AVM threshold table 850, consistent with certain embodiments of the invention. AVM threshold table 850 reflects volatility-adjusted model thresholds for various housing volatility scores. As shown in FIG. 8B, for the base housing volatility index of 100, system 100 expects the AVMs to achieve 79.92% accuracy within a 10% target confidence. The base coverage can be determined, for example, by considering the historical accuracy of various AVMs during periods of similar volatility. For example, 79.92% may be the median target coverage of one or more AVMs for the January 2000 time period.

As discussed, 79.92% is the base target coverage corresponding to a housing volatility index score of 100. Once this base target coverage is determined, method 700 moves to step S703, and AVM evaluation engine 123 adjusts the base target coverage according to the housing volatility index. For example, assume the housing volatility index as of June 2009 stood at 110, as shown in FIG. 8A. Accordingly, system 100 expects that the performance of the AVMs will be somewhat degraded relative to the performance of the AVMs during periods of lesser volatility, such as January of 2000.

AVM evaluation engine 123 may adjust the base target coverage using the following formula:

adjusted target coverage=base target coverage*(base volatility index/volatility index for period of interest)

Consider the case where the period of interest is June 2009, with a corresponding volatility index of 110. By multiplying the base target coverage of 79.92% by a factor of (100/110), system 100 may obtain a target coverage of 72.65% for June of 2009. In other embodiments, more sophisticated mathematical techniques may be used by AVM evaluation engine 123 to calculate the target coverage. For example, housing volatility could serve as an input to a linear regression model, stochastic model, or other model that evaluates the performance of the AVMs.

Target coverage can also be adjusted according to a probability distribution, such as a normal distribution. For example, assume for a base period that the volatility index is 100, and the base target coverage for a target confidence of 10% is one standard deviation (approximately 68%). In other words, approximately 68% of the price estimates by an AVM are within 10% of the actual sales prices, i.e., the range of +/−10% of the sales price covers +/− one standard deviation of the price estimates during the base time period.

Now, consider an example that seeks to adjust the base target coverage for a period of interest after the base period. Further, assume that the volatility increases by 50% from the base period to the period of interest, i.e. from 100 to 150. Using the previously-discussed technique, an embodiment consistent with the principles of the invention may directly multiply the base target coverage by 100/150, i.e. the ratio of the base volatility index to the volatility index for the period of interest, and obtain a target coverage of approximately 45% (68%*100/150).

Another embodiment may assume that the AVM error will follow a normal distribution, and adjust the target coverage accordingly. To do so, such an embodiment may adjust the number of standard deviations for our base period by the ratio of the base volatility index to the volatility index for the period of interest, i.e. (1 std. dev.*100/150)=⅔ std. deviation. In a normal distribution, ⅔ of one standard deviation corresponds to about 49.5%. Thus, the expected target coverage for the period of interest is approximately 49.5%. In other words, this embodiment expects 49.5% of the estimates by the AVM to be within 10% of the actual selling prices when the volatility index is 150.

In some embodiments, AVM evaluation engine 123 may also calculate adjusted target coverages for different levels of volatilities before they are needed and store them in AVM threshold table 850, as shown in FIG. 8B. In other embodiments, AVM evaluation 123 may defer calculating adjusted target coverage until they are needed.

Once AVM evaluation engine 123 adjusts the target coverage to account for the volatility at particular time periods, method 700 moves to step S704. In step S704, AVM evaluation engine 123 compares AVM performance data 800 with the adjusted target coverage in AVM threshold table 850 to determine whether each AVM is sufficiently accurate for a particular time period. For example, as shown in FIG. 8A, AVM 1 estimated 76% of home values within the target confidence of 10% for June 2009.

As shown in FIG. 8B, the corresponding target coverage for June 2009, corresponding to the June 2009 index of 110, is 72.65%, so AVM 1 exceeded the target coverage—in a sense, AVM 1 "passed" for June of 2009. Using this criteria, system 100 determines that AVM 1 maintained sufficient accuracy during June 2009, given the housing market volatility at that time. Note that the 76% accuracy would not have been sufficient to meet the target coverage during the base month of January 2000, as the base target coverage for an index of 100 is 79.92%.

AVM evaluation engine 123 continues with steps S703 and S704, adjusting target coverages to account for volatility at various times and comparing the performance of each AVM during each time with the adjusted target coverages. In FIG. 8A, AVM performance data table 800 is illustrated with each "pass" in bold text, and with each "fail" in unbolded text to reflect that the AVM did not meet the target coverage. In the example shown in FIG. 8A, AVM 1 consistently exceeded the adjusted target coverages, while AVM 2 consistently failed to meet the adjusted target coverages. AVM 3 met the target coverages during June and July of 2009, but failed to meet the target coverage in August of 2009. In some embodiments, these "pass" or "fail" results may be output in step S705 by illustrating the pass or fail results in a web page sent to the user at client terminal 110.

By using method 700 as described above, system 100 can analyze the performance of the AVMs. AVM 1 is relatively robust, and appears to be capable of continuing to provide reasonable accuracy even during periods of relatively volatile prices. Conversely, AVM 2 consistently fails to meet target coverages, regardless of volatility. A more interesting case is AVM 3, which appears to exhibit a relatively consistent level of accuracy (around 77%) regardless of volatility. A user might note that AVM 3 failed to improve in accuracy during the period with the relatively low volatility index of 100 in August of 2009, despite reasonably good performances in June and July of 2009. Knowing these characteristics of AVM 3, a user could perform a more detailed study of the differences between AVM 1 and AVM 3 to ascertain why AVM 3 does not improve its performance at times when the housing market is less volatile, yet maintains reasonable performance in volatile markets.

The national housing volatility index disclosed above may be used to evaluate an AVM by estimating property values with the AVM and then adjusting the target coverage in accordance with the national index. However, there may be wide variations in housing volatility across properties based on geographical location, loan type, or property type. Thus, if a particular AVM is evaluated only against particular types of property, it may be desirable to use an index tailored to the particular property type to adjust the thresholds for the AVM.

As an example, consider an AVM used exclusively to evaluate condominium prices, and further assume that condominium prices exhibit substantially less volatility than the overall U.S. housing market. If system 100 used the U.S. national housing volatility index to evaluate the performance of the condominium-only AVM, the result would essentially be giving the AVM an unfair "advantage." Instead, system 100 can calculate a condominium-only housing volatility index by extracting only condominium properties in property transaction data 131 and applying method 300 to these condominium properties. The resulting adjusted target coverages in AVM threshold table 850 would be based on the condominium-only index, and system 100 would likely produce a higher target coverage than that produced for used the overall U.S. housing volatility index.

Similarly, when an AVM is used only on some geographic subset of the overall U.S. housing market, system 100 can adjust the target coverage for this type of AVM in a manner similar to that discussed above for condominiums. For example, if an AVM is only applied to the top 20 metro areas in the U.S., system 100 can be adjusted to extract those properties in property transaction data 131 that fall within the top 20 metro areas. Next, system 100 can calculate an index specifically for the top 20 metro areas, and adjust the target coverages based on this index, rather than the U.S. national volatility index.

Note that the disclosed embodiments offer at least two options for tailoring target coverages to specific subsets of the overall U.S. housing market. One option is to establish a base target coverage that is specific to a targeted subset of properties. To do so, the base target coverage could be derived by evaluating one or more AVMs on the specific subset of interest during a base month, such as January 2000. In such an embodiment, system 100 may use the housing volatility for the subset of interest as of January 2000 as the base volatility level of 100. Thus, in the case of condominiums, a base index of 100 for the condominium-specific index would correspond to a lower level of volatility than the national base index of 100.

Alternately, system 100 may employ the previously discussed methodology for creating a base target coverage, e.g. it could use the median coverage of one or more AVMs on nationwide home sales as of January of 2000, rather than a condominium-specific base target coverage. In such an embodiment, it may be desirable to use the national level index as the base index, rather than a condominium-specific index. Otherwise, the base index would correspond to a data set that is different from the data set used to determine the base coverage. Generally speaking, it is preferable that the base target coverage and base index are derived from the same or similar data sets.

Some embodiments may use mathematical equivalencies that permit alternative means of performing method 700. As one example, the weighted standard deviation calculated in method 300 is a suitable substitute for the national index as a means of adjusting target coverages. The indexing scheme described above is largely a matter of convenience for adjusting the standard deviations in a manner that is easy for a person to understand. Some embodiments may stop short of calculating an actual index, and adjust the target coverage for a particular AVM using the standard deviation as a substitute for the index.

Specifically, the embodiment discussed above used the formula: adjusted target coverage=base target coverage* (base volatility index/volatility index for period of interest). Alternative embodiments may substitute standard deviations for the volatility indices in the formula to adjust the target performance thresholds. Also, various robust measures of the spread of a distribution can be substituted for standard deviations.

Price Dispersion

As discussed above, AVMs may be less reliable at estimating current property values under circumstances where the housing market exhibits high volatility. Further, indications from studying other markets, such as the stock market, show that volatility is unlikely to be very high in one month and fall to next to zero the next month, and similarly experiences from other markets indicate that volatility is unlikely to instantaneously jump from near zero to very high volatility. Accordingly, at any given time, it is not unreasonable to assume that volatility will not vary drastically in the near future—in other words, recent measures of volatility are somewhat predictive of future volatility.

Certain embodiments consistent with the invention may take advantage of this characteristic of housing volatility and apply it to future price predictions. For example, one embodiment of server 120 includes a forward pricing model 124 that estimates the value of houses over a certain number of years in the future. Forward pricing model 124 may not be 100% accurate under the best circumstances. However, it is useful to recognize that forward pricing model 124 is likely to be less accurate at predicting housing prices during the near future (e.g., over the next two years) if current housing market volatility is particularly high. Likewise, if the current housing market volatility is particularly low, it is reasonable to expect forward pricing model 124 to generate a more accurate prediction of future prices.

For example, consider a particular forward pricing model 124 that estimates prices of certain houses at yearly intervals for the next five years. In five years, the houses will likely have prices that vary from the predicted prices. The difference between the predictions and the actual prices represents the dispersion of forward pricing model 124 from the actual values of the houses. Because the future dispersion of the estimates from forward pricing model 124 are interrelated to current volatility in home prices, a housing volatility index can be used to help predict expected dispersion with forward pricing model 124.

Figure 9:
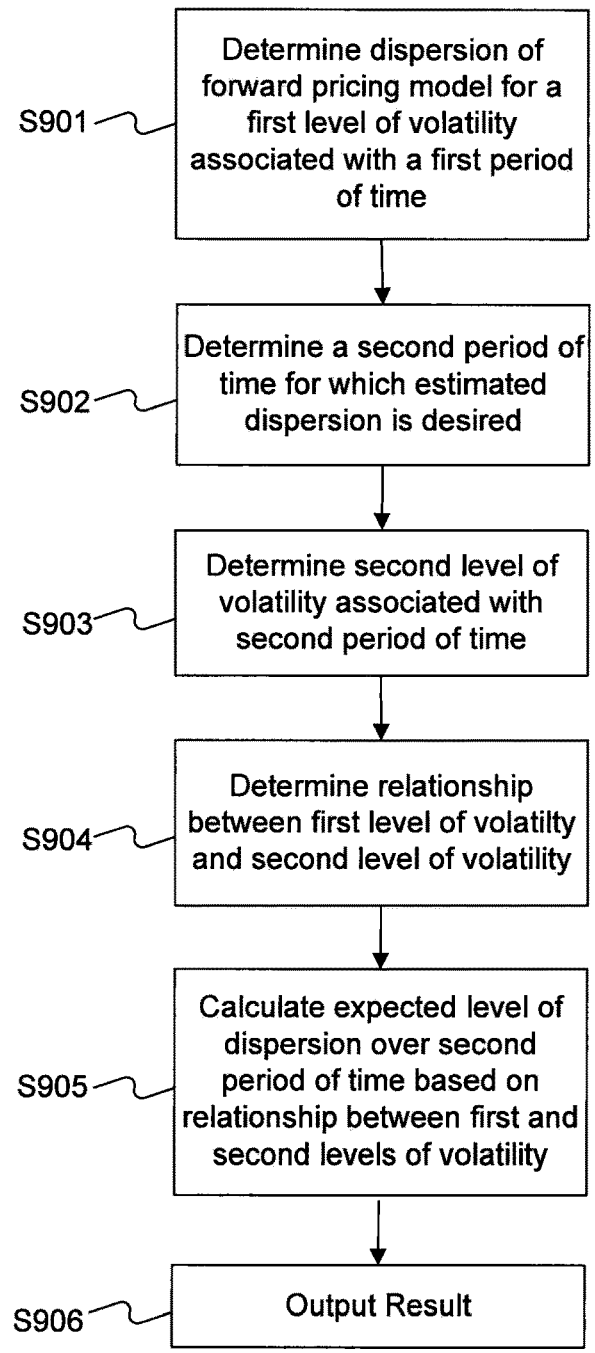
FIG. 9 is a flowchart of an exemplary method, consistent with certain embodiments of the invention.

FIG. 9 illustrates an exemplary method 900 for quantifying an expected dispersion of forward pricing model 124.

At step S901, forward pricing model 124 on server 120 determines the dispersion level for a first level of volatility associated with a first period of time. For example, forward pricing model 124 may retrospectively determine the amount of dispersion for a period of time following January 2000, which is set to a baseline volatility index of 100. The levels of dispersion may be stored in a volatility-adjusted pricing dispersion table 1000, shown in the example of FIG. 10.

The percentages reflected in volatility-adjusted pricing dispersion table 1000 may represent ranges of price dispersion, i.e. amounts that actual housing prices are expected to vary from the estimates by forward pricing model 124. The dispersion measure may be in terms of an expected coverage for a given target confidence. Assume for the purposes of this example that system 100 is set with a target confidence of +/−10%. In that case, the percentages in volatility-adjusted pricing dispersion table 1000 reflect the percentage of estimates by forward pricing model 124 that are outside the target confidence of +/−10%.

In generating volatility-adjusted pricing dispersion table 1000, forward pricing model 124 may start by determining how much price dispersion is associated with the base time period, in this example, of January 2000. First, forward pricing model 124 may be used to estimate future home values for January of 2001, 2002, 2003, etc., based on data available to forward pricing model 124 as of January 2000. Then, system 100 can measure what the actual value of these properties was as of these subsequent dates, for example by comparing the estimated home values with actual sales prices in property transaction data 131. As shown in FIG. 10, the percentage of 2-year price paths associated with a volatility index of 100 deviating from the mean path by more than 10% is 12%. This dispersion data can be extrapolated into the future. For example, if the current volatility is 100 and system 100 uses forward pricing model 124 to predict the value of a number of properties in two years, a user may reasonably expect 12% dispersion, i.e. 12% of the predicted 2-year out paths will be outside of our target range of 10%. Conversely, 88% of the predicted paths will likely be within 10% of the properties' actual values.

Continuing with the example, volatility-adjusted pricing dispersion table 1000 shows that, for a volatility of 100, the three-year dispersion is 15%, the four-year dispersion is 20%, and the one-year dispersion is 10%. These percentages, shown in bold in FIG. 10, represent a retrospective correlation between housing volatility and the price dispersion of our forward pricing model 124, based on January of 2000. Thus, the bold dispersion percentages in volatility-adjusted pricing dispersion table 1000 represent an empirical baseline estimate of dispersion percentages associated with a national housing volatility index of 100. As discussed below, based on this empirical baseline, system 100 can make certain assumptions about expected price dispersion of forward pricing model 124 for later time periods with different volatilities.

Once system 100 computes these base levels of price dispersion associated with a base housing volatility index of 100, method 900 moves to step S902. At step S902, forward pricing model 124 determines a second time period of interest for which an estimated dispersion is desired. For example, a user at client terminal 110 may request an estimate of forward pricing dispersion of forward pricing model 124 for four years, starting in May of 2009. As discussed below, forward pricing model 124 will estimate the model dispersion for May 2010, 2011, 2012, and 2013 by adjusting the base dispersion associated with January 2000 to account for the housing market volatility as of May of 2009.

Upon determining that the user is interested in pricing dispersion beginning in May 2009, method 900 moves to step S903. At step S903, forward pricing model 124 may determine a second level of volatility associated with a second time period, e.g., May of 2009. For example, forward pricing model 124 may obtain a measure of housing volatility from volatility engine 122, such as the national home volatility index generated by method 300. In some embodiments, forward pricing model 124 may use several chronologically consecutive measures of volatility to determine the measure of housing volatility. For example, forward pricing model 124 may use a moving average of volatility over the two years preceding the time period of interest. In still other embodiments, forward pricing model 124 may obtain one or more future estimates of volatility, such as having volatility engine 122 perform a linear regression to estimate future volatility based on previous volatility measurements. In still another embodiment a user could model a forward view of housing volatility by applying an Autoregressive Integrated Moving Average (ARIMA) process to the volatility index, or Autoregressive Integrated Moving Average Index (ARIMAX), including economic variables, or even build a model using just economic fundamentals using selected information on historical volatility.

Once forward pricing model 124 has obtained a measure of volatility for May of 2009, method 900 moves to step S904, where forward pricing model 124 determines a relationship between the first level of volatility for January of 2000, and the second level of volatility for May of 2009. In one embodiment, forward pricing model 124 determines this relationship simply by dividing the volatility for May of 2009 by the volatility for January of 2000. Thus, assuming the volatility for May of 2009 is 120, the relationship determined at step S904 is a factor of 1.2, i.e. 120/100. In other embodiments, the current volatility may be used as an input into forward pricing model 124, and techniques such as statistical Autoregressive Integrated Moving Average (ARIMA) models, Autoregressive Conditional Heteroscedasticity (ARCH) models or Generalized Autoregressive Conditional Heteroscedasticity (GARCH) models, or other time series modeling techniques are applied to account for the higher level of volatility.

After determining the relationship between the first and second volatility levels at step S904, method 900 moves to step S905. At step S905, forward pricing model 124 calculates an expected level of dispersion for the second time periods based on the relationship between the first and second volatility levels. As a simple example, consider computing an estimate of the future price dispersion of forward pricing model 124 if housing volatility is similar to the volatility in January of 2000 (i.e., the current housing volatility index is 100). In this simple example, the future price dispersion would be similar to the retrospective percentages obtained empirically from the baseline of January of 200, as discussed above. In this case, system 100 may use the base percentage dispersions from January of 2000 to estimate how much future dispersion will occur in one, two, three, and four years time—i.e. 10%, 12%, 15%, and 20%, respectively, as shown in the "100" volatility row of volatility-adjusted pricing dispersion table 1000.

Consider now the previous example, where the national home volatility index for May of 2009 is 120. A user would expect to see increased dispersion from forward pricing model 124 as a result of this increased volatility, relative to the base month of January 2000. As discussed above, system 100 calculated a factor of 1.2 to account for the increased volatility in May 2009, and, in an embodiment where a linear relationship between volatility and dispersion is used, system 100 applies the 1.2 factor to the baseline dispersion. Thus, for the future period of January 2014—four years after system 100 estimates the values—a user might expect to see 1.2*20%=24% dispersion. In other words, by 2014, the user may expect 24% of price estimates by forward pricing model 124 to be outside the target confidence of +/−10%.

Continuing with this example, forward pricing model 124 can calculate a number of different volatility-adjusted dispersions and store them in volatility-adjusted pricing dispersion table 1000. As shown in FIG. 10, if forward pricing model 124 estimates a number of property values two years in the future at a time when the national housing volatility index is 80, system 100 calculates a 9.6% dispersion, or 80/100*12%. The 9.6% number is less than the 12% dispersion obtained for the January of 2000 data, which reflects the expectation that forward pricing model 124 can more accurately predict future housing values when housing volatility is lower. As noted above, this example describes an embodiment that uses a linear relationship between volatility and dispersion. Other embodiments, using different and more complex functions to model the relationship between volatility and dispersion, are also within the scope of the invention.

After calculating the dispersions associated with the second time period, method 900 moves to step S906. At step S906, forward pricing model 124 responds to the request by the user at client terminal 110 by sending the calculated or previously stored dispersion level in response to the request. Thus, the user at client terminal 110 can see, for example using web browser 111, volatility-adjusted pricing dispersion table 1000. Thus, the user can see that the expected future pricing dispersion for the forward pricing model is 12% in one year (May 2010), 14.4% in two years (May 2011), 18% in 3 years (May 2012), and 24% in four years (May 2013).

Figure 11:
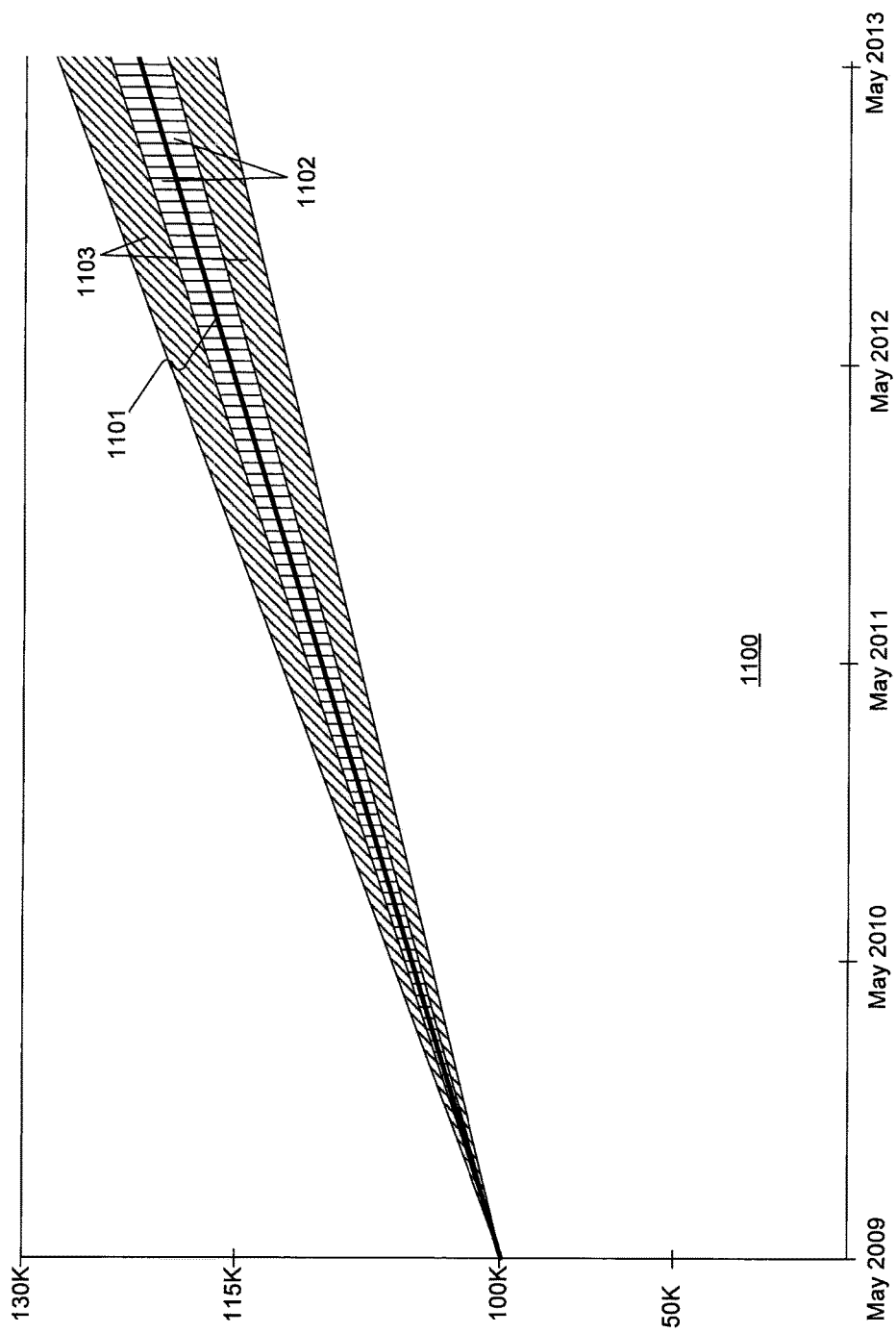
FIG. 11 illustrates an exemplary graph, consistent with certain embodiments of the invention.

In some embodiments, method 900 can generate a graph showing a window of future prices for a property (or average prices for a group of properties), based on the dispersion of forward pricing model 124. FIG. 11 illustrates a pricing dispersion graph 1100. In pricing dispersion graph 1100, forward price estimate line 1101 represents the future estimated prices of one or more properties, output by forward pricing model 124. Dispersion area 1102 may represent an expected price range associated with a first level of volatility, for example 100. Dispersion area 1103 may represent an expected price range associated with a higher level of volatility, for example 120. In some embodiments, these price ranges are obtained by using the home volatility index directly as an input to forward pricing model 124.

As shown in FIG. 11, the initial value of a property in May of 2009 is $100k. However, if the volatility index in May of 2009 is at a higher value such as 120, forward pricing model 124 is expected to be less accurate at predicting future values. Accordingly, dispersion area 1103 encompasses a broader range of prices than dispersion area 1102. Note also that both dispersion area 1102 and dispersion area 1103 diverge from forward price estimate line 1101 over time. This reflects the fact that, even with low volatility, forward price estimates tend to grow less accurate as they predict further into the future.

In some embodiments, dispersion areas 1102 and 1103 may correspond to some confidence interval. For example, dispersion area 1102 may represent a range of prices for a given property corresponding to a 90% confidence that the property value estimates by forward pricing model 124 will fall within the range. Likewise, dispersion area 1103 may represent the same 90% confidence interval for a higher volatility. Because dispersion area 1103 corresponds to a higher level of volatility, dispersion area 1103 encompasses a broader range of prices.

In many ways, evaluating future price dispersion of forward pricing model 124 is similar to evaluating AVMs. In particular, some embodiments may select particular subsets of property transaction data 131 to perform method 900. For example, if forward pricing model 124 is used to estimate only condominium values, system 100 may select only condominiums from property transaction data 131, and adjust the dispersion levels using condominium-specific volatilities.

Estimating Foreclosure Losses

Housing market volatility may also be predictive of future housing prices. In a housing recovery, housing prices may tend to exhibit certain traits, such as consistently increasing housing prices at a relatively constant rate. In contrast, falling housing prices may tend to be particularly volatile. This situation may be exacerbated, as in the current housing crisis, because foreclosed properties may tend to sell for far less than comparable nonforeclosure sales. For a lender, it may be desirable to incorporate a measure of housing volatility into a model that estimates future foreclosure losses.

Further, as discussed above, forward pricing model 124 may tend to have a higher dispersion when housing markets are volatile. This may have certain ramifications for parties having an interest in the underlying property. For example, a lender in a very stable housing market, i.e., one with very little volatility, can fairly accurately predict expected losses for a foreclosure on a particular property. On the other hand, if the market is very volatile, the lender may be substantially less certain as to how much loss will result from foreclosing on the property. This is because housing volatility may affect the range of values the lender can expect the house to have in the future.

Moreover, housing volatility may correspond to the likelihood that a foreclosure will occur. Borrowers are more likely to default on a mortgage when they owe more than the value of the home, and this circumstance is more likely to occur when there are large swings in the housing market. Further, volatile housing markets may be correlated to broader negative economic circumstances such as layoffs, firings, pay cuts, or other circumstances that may cause borrowers to default. Thus, in one embodiment, housing volatility is used to serve as a proxy for these circumstances in estimating the number of foreclosures that will occur during any given period of time.

Figure 12:
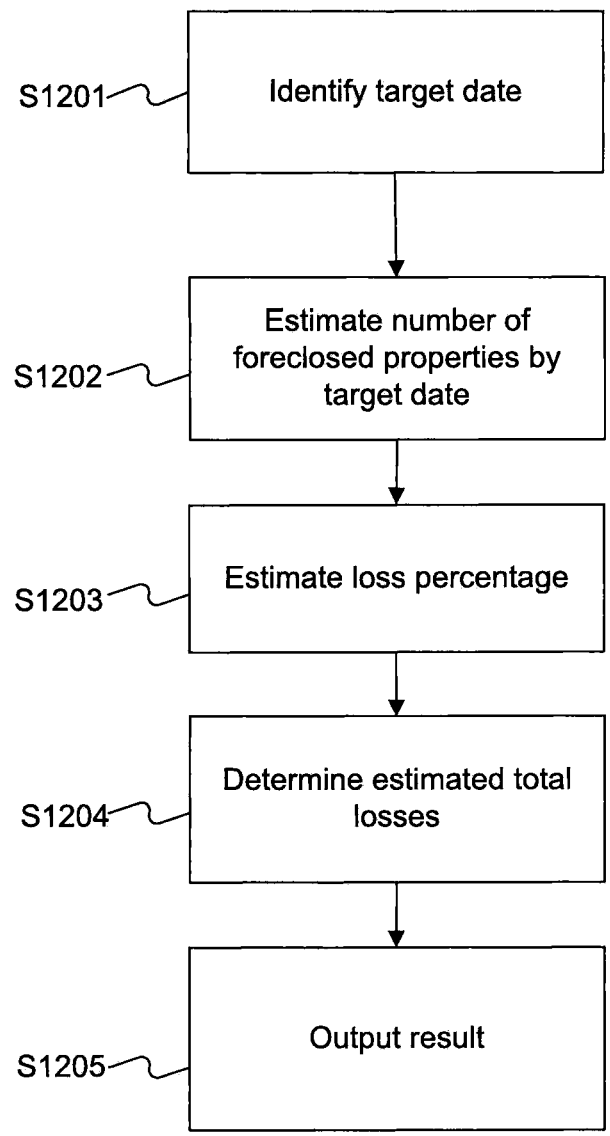
FIG. 12 is a flowchart of an exemplary method, consistent with certain embodiments of the invention.

As shown in FIG. 1, server 120 may include a foreclosure loss estimator 125 for estimating foreclosure losses. To estimate the foreclosure losses, foreclosure loss estimator 125 may perform a method 1200, shown in FIG. 12. Method 1200 may operate on data representing a group of properties, each secured by one or more loans. Method 1200 may estimate the losses that the lender may incur over time due to foreclosures on the properties.

Method 1200 begins at step S1201, with foreclosure loss estimator 125 identifying a target date for which the estimated foreclosure losses are desired. In some embodiments, the target date will simply be the last date on which payments are due for any of the properties of interest. In other embodiments, a user at client terminal 110 may specify a date of interest, for example five years from today, and foreclosure loss estimator 125 will estimate the total foreclosure losses over the next five years for the loans identified by the user. Foreclosure losses tend to accumulate over time, as more and more properties from a particular group of loans suffer defaults and eventually foreclosures. Thus, by using a target date, system 100 can estimate the amount of losses that will accrue from a particular group of loans by the target date. For the current example, assume that the user specifies a target date five years in the future.

Once the target date is identified, method 1200 moves to step S1202, where foreclosure loss estimator 125 estimates a number of properties that will be foreclosed on by the target date. This estimate may be based on previous analyses of foreclosure data. Consistent with the approach in previous examples and embodiments, system 100 may have some retrospective data for a base month, such as January 2000, to construct a baseline.

FIG. 13 illustrates an expected foreclosure data table 1300. As shown in FIG. 13, a housing volatility of 100 for our base month corresponds to an 8% foreclosure rate. In some embodiments, the foreclosure rate for January of 2000 is empirically derived. For example, system 100 may analyze stored foreclosure data to determine that in the five years following January of 2000, 8% of properties were foreclosed upon.

Once system 100 establishes the foreclosure rate in a base year, it can estimate the number of properties that will be foreclosed upon in the next five years. For example, assume there are 100 properties and corresponding loans of interest, and the current housing volatility index is 80. Taking the approach discussed in previous examples and embodiments, system 100 may can calculate the ratio of the current volatility index to the base volatility index, i.e., 80/100, and multiply the resulting factor by the foreclosure rate for the base month. Thus, as shown in FIG. 13, because of the relatively low current volatility index of 80, system 100 indicates that only 6.4% of the properties are predicted to be foreclosed upon over the next five years. In the embodiment described in this example, the relationship between volatility and foreclosure rate is modeled as a linear relationship. In other embodiments, other mathematical models may be used to model this relationship and determine a predicted foreclosure rate. The volatility can also be used to determine the spread of house price paths for simulating mortgage cash flows and defaults. When the volatility index is 80, the spread of paths is narrow, while there is a wide spread of future paths when the volatility index is 150. The house price paths then enter into a default model and also may enter into a prepayment model.

Once system 100 has an estimated percentage of properties that will be foreclosed by the target date, method 1200 moves to step S1203, where foreclosure loss estimator 125 determines estimated loss percentages for the properties. In a similar manner as discussed above, foreclosure loss estimator 125 may do so by adjusting the loss percentage for a base month (in this example, January of 2000), by the ratio of the volatilities. Thus, as shown in FIG. 13, the base loss percentage for an index of 100 is 9.6%. Linearly scaling the loss percentage by a ratio of 80/100, the embodiment shown calculates an adjusted loss percentage on each property of 7.68%. This reflects the expectation that, in a less volatile market, home values will be more stable and a lender may expect to lose less money on the foreclosure sale of any particular house. That is, for any loan, house price volatility will affect not only the probability of default and prepayment, but also the severity of loss when a loan defaults, having a double effect on the loan value.

After determining the volatility-adjusted foreclosure rate and loss percentage as discussed above, method 1200 moves to step S1204. In step S1204, foreclosure loss estimator 125 determines estimated total losses for the properties of interest to the user. In our example, the user at client terminal 110 identified 100 properties of interest. Assuming the average property value is $100k, system 100 calculates a total property value of $100k*100=$10,000,000. Given the foreclosure rate of 6.4%, system 100 estimates there will be 6.4 foreclosures from the 100 properties. Further, given the expected loss percentage of 7.68%, system 100 calculates an estimated loss of $7,680 per foreclosed property. System

100 may then calculate an expected total loss for the next five years of $7,680*6.4=$49,152.

Once system 100 has determined the estimated loss, method 1200 moves to step S1205, where foreclosure loss estimator 125 outputs the resulting expected loss of $49,152. Foreclosure loss estimator 125 may do so, for example, by sending the value in a web page to client terminal 110 for display by web browser 111.

Valuing Options

A housing volatility index may also be useful for trading purposes. In the stock market, it is common to arrange trades directly on the volatility in the stock market, rather than trading based on whether the stock market will go up or down. However, as there is no mathematical measure of volatility in the housing market, it is not possible to arrange trades directly on housing volatility. Moreover, stock option prices tend to be influenced by the level of volatility in the stock market. However, there are limited opportunities to trade options on housing-backed securities, partly because there is no widely accepted measure of volatility in the housing market.

To understand how a housing volatility might be applied to trading housing-backed securities, it may be helpful to understand how these securities are packaged. In some cases, mortgages on properties are aggregated into securities, often called mortgage-backed securities ("MBS"), one type of which are known as "pass-through certificates," or "PC's." With a PC, the owner of the security receives interest and principal payments from the underlying mortgages, usually through the loan servicer. Thus, the value of a particular PC can be heavily influenced by the value of the underlying mortgage loans and properties. For example, if a large number of loans underlying a particular PC default and enter foreclosure, the holders of the PC, or a guarantor thereof, may stand to lose large amounts of money. Conversely, if none of the loans underlying a PC ultimately default or foreclose, the PC may have a future return that is substantially higher than its current market price would suggest.

Accordingly, the value of any particular PC may depend to some degree on the volatility in the prices of the houses underlying the PC. In a circumstance where the underlying home prices are exhibiting high volatility, the value of the PC may be expected to decline in the future due to foreclosure losses. This decline may be expected because, as explained previously, foreclosure rates may rise during high periods of housing price volatility. On the other hand, if the underlying home prices are exhibiting low volatility, the value of the PC may be expected to rise, as the low volatility may tend to diminish foreclosure losses.

Some embodiments consistent with the invention value a PC using expected foreclosure losses, which are predicted based on expected volatility. In one such embodiment, system 100 determines the "face value" of the PC, i.e. the expected total interest payments on the PC over the life of the loans, as a first step. From this face value, system 100 subtracts an expected foreclosure losses value, which is in turn calculated with reference to volatility levels. In this way, system 100 uses volatility levels to help estimate the current value of a given PC or other MBS. System 100 may also subtract loss or add value from changes in the prepayment rate due to housing volatility as well as the foreclosure adjustments.

Another embodiment consistent with the invention values an option based on home volatility. One type of option is known as a "call" option. In a call option, the option holder purchases the right to buy a security, such as a PC or other MBS, at a "strike price." The call option is usually valid for a set duration, during which time the option holder can choose to exercise the option and buy the security at the strike price. Thus, if the market value of the security exceeds the strike price during the option period, the option holder can make a profit by exercising the option, purchasing the security at the strike price, and selling the security for market value. However, if the market value of the security never reaches the strike price during the option period, the option holder loses the price they paid for the option.

Another type of option is called a "put." In a put, the option holder purchases the right to sell a security, such as an MBS, at the strike price during the option period. Thus, if the market value of the security falls below the strike price, the option holder can improve their position by selling the security at the strike price rather than at the lower, market price. Again, however, if the market price of the security never falls below the strike price during the option period, the option holder loses the price they paid for the option.

Note that options are essentially worthless without price changes. The odds that an option will ever reach the strike price are zero if prices never change. Conversely, if the market is very volatile, the odds of reaching the strike price are much higher. For this reason, highly volatile security prices tend to increase the prices of options written on the underlying security.

Figure 14:
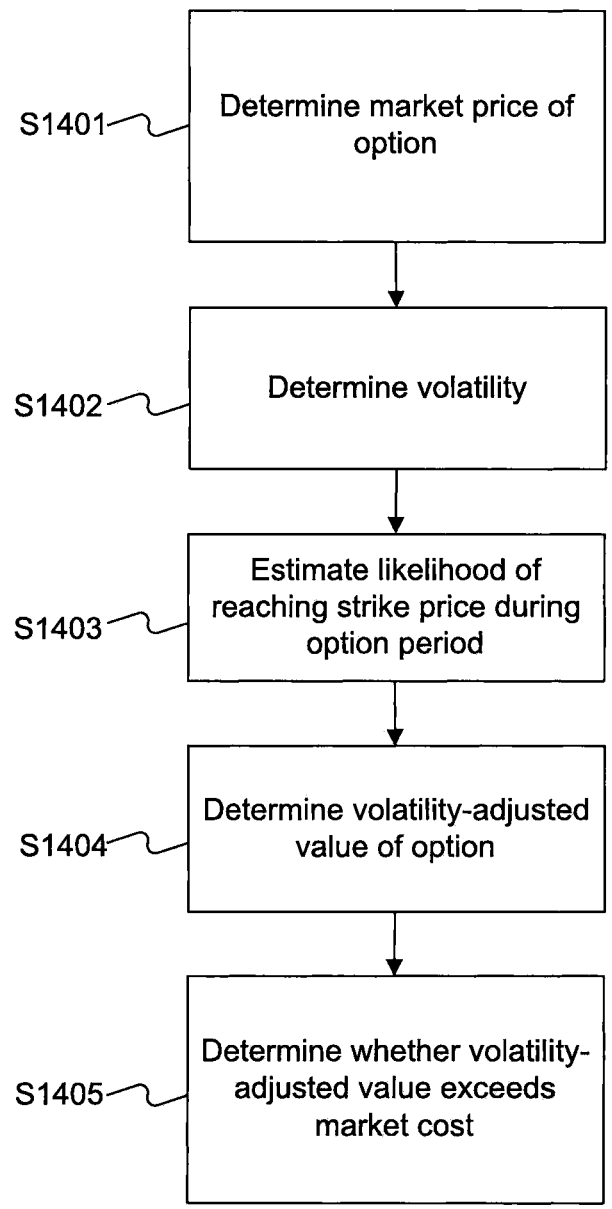
FIG. 14 is a flowchart of an exemplary method, consistent with certain embodiments of the invention.

As shown in system 100 of FIG. 1, server 120 may include an option evaluation engine 126. Option evaluation engine 126 may perform a method 1400 for determining whether an MBS option value exceeds the market price of the option, as illustrated in FIG. 14.

Method 1400 beings at step S1401, where option evaluation engine 126 determines the market price for a particular option on an MBS, such as a PC. For example, the option may be a simple put or call option, or may be more complex types of options. Option evaluation engine 126 may do so in response to a user request from client terminal 110, requesting evaluation of the PC option. To determine the market price for the option, option evaluation engine 133 may access PC option market prices 133 on data repository 130.

Once option evaluation engine 126 determines the market price for the identified PC, method 1400 goes to step S1402. At step S1402, option evaluation engine 126 determines the current home volatility index, by, for example, requesting the current home volatility index from volatility engine 122. For purposes of this example, assume the current home volatility index is 110, determined using method 300.

After the current volatility index is determined, method 1400 moves to step S1403. At step S1403, option evaluation engine 126 estimates the likelihood that the PC option will reach the strike price during the option period. In the case of a call, option evaluation engine 126 may also estimate the extent to which the PC's market price will exceed the strike price. In the case of a put, option evaluation engine 126 may estimate the extent to which the strike price will exceed the PC's market price. Option evaluation engine 126 may do so, for example, by incorporating the housing volatility index (in addition to other driving economic factors, such as mortgage rates, loan's or borrower's characteristics) into a pricing model for PC in a manner similar to that explained with respect to estimating foreclosure losses or overall prepayment impact to the cash-flow of PC. Such a pricing model may correlate housing market volatility with expected fluctuations in PC prices.

After option evaluation engine 126 determines the likelihood of the PC option reaching the strike price, method

1400 moves to step S1404. At step S1404, option evaluation engine 126 determines an estimated value for the option, based on the likelihood that the option will reach the strike price during the option period. The more likely the option is to reach the strike price, the more valuable the option. In addition, in the case of a call, option evaluation engine 126 also incorporates the amount that the strike price is likely to exceed the market value of the PC into the estimated value of the call. Similarly, in the case of a put, option evaluation engine 126 incorporates the estimated amount that the PC market price is expected to exceed the strike price into the estimated value of the put.

At this point, method 1400 moves to step S1405. At step S1405, option evaluation engine 126 determines whether the volatility-adjusted market value determined at step S1404 exceeds the market price determined at step S1401. In some embodiments, option evaluation engine 126 sends the estimated option value to the user at client terminal 110. In still further embodiments, option evaluation engine 126 may classify the option as a "buy" when the volatility-adjusted value exceeds the market price. In such embodiments, option evaluation engine 126 may also classify the option as a "sell" if the volatility-adjusted value is less than the market price.

Direct Trading on Home Volatility Index

Figure 15:
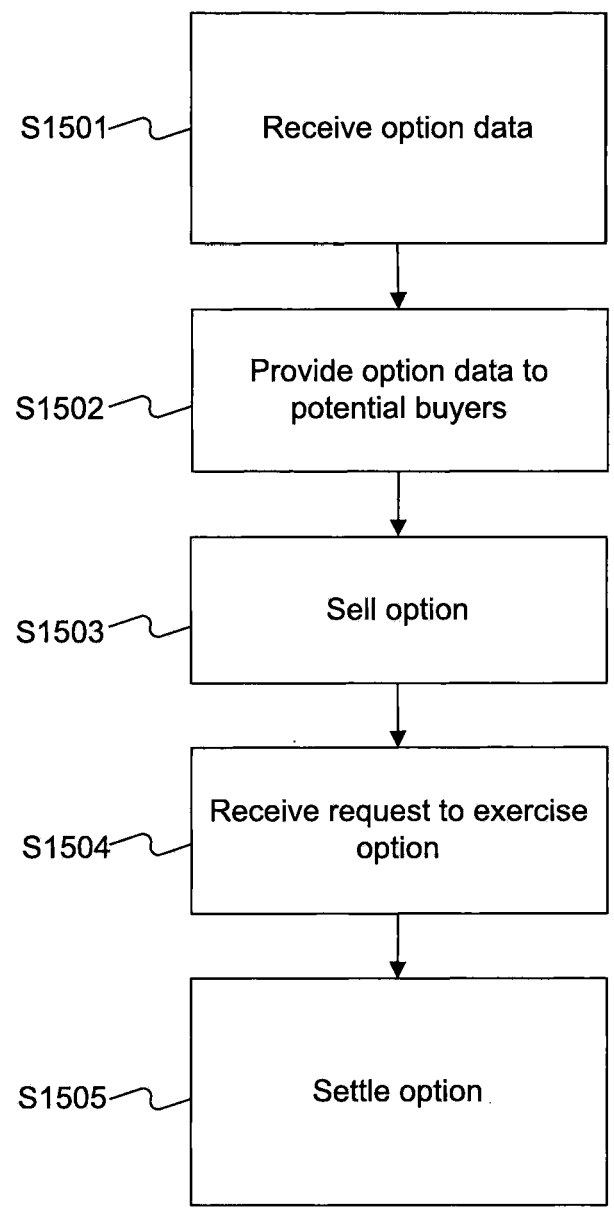
FIG. 15 is a flowchart of an exemplary method, consistent with certain embodiments of the invention.

The housing volatility index may also be used directly for trading purposes, for example by writing options on the housing volatility index itself. As shown in system 100 of FIG. 1, server 120 may include a volatility trading engine 127. In one embodiment, volatility trading engine 127 may perform a method 1500 for selling an option on a housing volatility index, as illustrated in FIG. 15.

Method 1500 beings at step S1501, where volatility trading engine 127 receives option data for options on the housing volatility index. For example, an employee of a financial entity such as a bank may provide the option data from underwriter terminal 140. In this manner, the financial entity may offer an option for sale to prospective buyers. The option data may include a strike price, cost, and expiration date for the option, as well as data reflecting the type of option (e.g. put, call, etc.). Server 120 may store the option data for subsequent retrieval.

This discussion will assume, for the purposes of example, that the strike price is 120, the cost of the option is $1.00, the expiration date is Jan. 31, 2010, and the option is a call option. Thus, the financial entity is agreeing to sell, for the price of $1.00, the right to "buy" the home volatility index for any "price" over 120. In other words, if the home volatility index exceeds 120 by Jan. 31, 2010, the buyer may exercise the option receive one dollar for each point that the housing volatility index exceeds 120. Also assume, for the purposes of the example, that the housing volatility index is 100 as of the date that the option is first offered.

After the option data is received, method 1500 moves to step S1502, where volatility trading engine 127 provides the option data to prospective buyers. For example, volatility trading engine 127 may transmit a web page for display on client terminal 110. The web page may indicate the strike price, cost, expiration data, and the type of option. The prospective buyer at client terminal 110 can thus discern that the option is available to be purchased from the financial entity through volatility trading engine 127.

Next, method 1500 moves to step S1503, where volatility engine 127 sells the option. For example, the prospective buyer at client terminal 110 may decide to purchase the option, and web browser 111 may then transmit data to volatility engine 127 to complete the purchase. In some embodiments, the cost of the option may be deducted from an account that is maintained by volatility engine 127. In other embodiments, the buyer may purchase the option using a credit card, debit card, online payment service, or any other electronic payment method. In either case, the payment may be transferred to an account owned by the financial entity, and maintained by volatility engine 127.

Next, method 1500 moves to step S1504, where volatility engine 127 receives a request to exercise the option. For example, the request may be received from client terminal 110, when the buyer decides to exercise the option. At this point, volatility engine 127 may also determine whether or not the option can be exercised. For example, for a call option, volatility engine 127 may determine whether the home volatility index exceeds the strike price. If not, the option cannot be exercised. In addition, volatility engine 127 may also determine whether the option has expired, and prevent the option from being exercised if the expiration date has passed.

For the purposes of continuing the example introduced above, assume that the housing volatility index is 125, and the request to exercise the call option is received on Jan. 20, 2010. Volatility trading engine 127 determines that the option can be exercised, because the request was received before the expiration date of January 31, and while the housing volatility index (125) exceeds the strike price (120).

Next, method 1500 moves to step S1505, where volatility engine 127 settles the option. Volatility engine 127 may do so by calculating the difference between the current housing volatility index and the strike price or other appropriate calculation depending on the type of option. In this example, the call option was exercised while the housing volatility index was 125, and the strike price was 120. Thus, the option buyer receives $5 when they exercise the option. Because the buyer paid $1 for the option, the buyer has made a $4 profit in our example.

Method 1500 may also be used to implement a put option. As an example, assume the financial entity underwrites a put option with similar option data as discussed above for the call option, i.e, the strike price is 120, the cost of the option is $1.00, and the expiration date is Jan. 31, 2010. Further, assume that the housing volatility index is 140, as of the date that the option is offered. The financial entity is agreeing to sell, for $1, the right to "sell" the housing volatility index for $120 if the index value goes lower than 120.

Now, assume a buyer decides to exercise the option on Jan. 20, 2010, and the current housing volatility index is 110. The difference between the strike price of 120 and the current index value of 110 is 10, so the buyer receives $10. Effectively, the buyer is exercising their right to sell the index at the strike price, instead of at the current value. In doing so, the buyer earns a profit of $9.

Policy Uses

Reliable information on housing volatility may also be valuable from a public policy perspective. While it may be possible for commentators to observe that the housing market is "volatile" relative to years past, these observations may not be suitably rigorous to form a basis for public policy. For example, recent government actions to stabilize the U.S. housing market are evaluated largely on an ad hoc basis—monthly reports on housing prices, housing inventories, and mortgage applications are used to evaluate these government actions. A suitable, reliable measure of housing volatility could serve as a means of evaluating the effectiveness of various government measures to remedy the present housing crisis. In the future, such a volatility measure could also serve as an early warning for potential housing bubbles, such that actions could be taken in time to prevent the catastrophic failures present in the current housing market.

Moreover, as discussed above, home price volatility may be predictive of changes in housing prices. For example, periods of historically low or high volatility may tend to predict potential upcoming periods where housing values could move dramatically. Thus, a housing volatility index may be useful from a policy perspective. To the extent that housing volatility serves as an "early warning" of future price changes, government policies can be adjusted or prepared earlier in the market cycle to mitigate future economic problems caused by the changes in housing prices.

Additional embodiments consistent with the invention use the national home volatility index, for example as presented in graph 600, to inform various policy decisions. If housing market volatility reverses from historically high levels back to historically average levels, this may be indicative that certain policies, such as the 2009 stimulus package or efforts to lower mortgage rates, are having the desired effect. Using a home volatility index consistent with the invention, policy makers may be able to implement similar measures earlier in the market cycle, i.e. when home price volatility first starts to climb. By adjusting policies in this way, governments, industry regulators, bankers, and other policy makers may be able to avoid large-scale economic damage, such as the damage associated with the current housing crisis.

On a more refined level, policy makers may be able to use home volatility indices on a locality-by-locality basis to inform decisions about where to concentrate policy efforts. In the current housing crisis, certain areas of the country were the first to begin exhibiting warning signs. Eventually, foreclosures in these areas began to have more systemic effects on the banking system, which in turn exacerbated the problem. By using locality-specific volatility indices, embodiments consistent with the invention may compare various areas of the country to determine which counties or states are particularly at-risk in the future. By concentrating policy efforts on the determined geographical areas when housing volatility starts to increase, policy makers may be able to mitigate or prevent widespread economic difficulties.

CONCLUSION

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Examples of hardware include computing or data processing systems, including personal computers, servers, laptops, mainframes, micro-processors and the like. Additionally, although aspects of the invention are described as being stored in memory, one skilled in the art will appreciate that these aspects can also be stored on other types of computer-readable media, such as secondary storage devices, for example, hard disks, floppy disks, or CD-ROM, or other forms of RAM or ROM.

Computer programs based on the written description and methods of this invention are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets. One or more of such software sections or modules can be integrated into a computer system or existing applications, such as spreadsheet or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A computer-implemented method performed by a processor hosted on a web-based server operably connected to a communication network over a first network connection, at least one networked database over the first and a second network connection, and a client terminal over the first and a third network connection, the method comprising:
   receiving, from the client terminal connected to the processor over the communication network, a user request over the first and third network connections to evaluate a market price for an option on a security;
   calculating, using an option evaluation engine implemented by the processor, the market price for the option, wherein the security is a mortgage-backed security backed by a plurality of loans on one or more underlying real estate properties;
   identifying, using the option evaluation engine implemented by the processor, an option period for the option, the option period being a period during which the security can be bought or sold for a strike price;
   determining, using the option evaluation engine implemented by the processor, a real estate market volatility index for the one or more underlying real estate properties based on property transaction data for the one or more underlying real estate properties;
   determining, using the option evaluation engine implemented by the processor, a likelihood that the market price of the option will reach the strike price during the option period;
   estimating, using the option evaluation engine implemented by the processor, a volatility-adjusted value for the option based on the determined real estate market volatility index and the determined likelihood;
   generating, by the processor, instructions that modify operation of a web page displaying the market price of the option, the volatility-adjusted value and a classification of the option, wherein the processor classifies the option as a "buy" when the volatility-adjusted value exceeds the market price or as a "sell" when the volatility-adjusted value is less than the market price; and transmitting, by the processor over the communication network over the first and third network connections, the created web page for display on the client terminal in response to the user request.

2. The computer-implemented method according to claim 1, wherein the option is a put option, and estimating the volatility-adjusted value for the option comprises estimating an extent to which the market price will exceed the strike price during the option period.

3. The computer-implemented method according to claim 1, wherein the option is a call option, and estimating the volatility-adjusted value for the option comprises estimating an extent to which the strike price will exceed the market price during the option period.

4. A system comprising:
a processor hosted on a web-based server operably connected to a communication network over a first network connection, at least one networked database over the first and a second network connection, and a client terminal over the first and a third network connection; and
a memory device in communication with the processor and having stored in computer-executable instructions, that when executed by the processor, cause the processor to:
receive, from the client terminal connected to the processor over the communication network, a user request over the first and third network connections to evaluate a market price for an option on a security;
calculate, using an option evaluation engine, the market price for the option, wherein the security is a mortgage-backed security backed by a plurality of loans on one or more underlying real estate properties;
identify an option period for the option, the option period being a period during which the security can be bought or sold for a strike price;
determine, using the option evaluation engine, a real estate market volatility index for the one or more underlying real estate properties based on property transaction data for the one or more underlying real estate properties;
estimate, using the option evaluation engine, a likelihood that the market price of the option will reach the strike price during the option period;
estimate, using the option evaluation engine, a volatility-adjusted value for the option based on the determined real estate market volatility and the determined likelihood;
generating instructions that modify operation of a web page displaying the market price of the option, the volatility-adjusted value and a classification of the option, wherein the processor classifies the option as a "buy" when the volatility-adjusted value exceeds the market price or as a "sell" when the volatility-adjusted value is less than the market price; and
transmit, over the communication network over the first and third network connections, the created web page for display on the client terminal in response to the user request.

5. The system of claim 4, wherein the option is a put option, and estimating the volatility-adjusted value for the option comprises estimating an extent to which the market price will exceed the strike price during the option period.

6. The system of claim 4, wherein the option is a call option, and estimating the volatility-adjusted value for the option comprises estimating an extent to which the strike price will exceed the market price during the option period.

7. The system of claim 4, wherein the memory further comprises instructions that, when executed by the processor, cause the processor to estimate the current value of a security by determining the face value of the security and subtracting expected foreclosure losses.

* * * * *